United States Patent
Oike

(10) Patent No.: US 12,530,756 B2
(45) Date of Patent: Jan. 20, 2026

(54) METHOD OF ADJUSTING DISPLAYED IMAGE AND DISPLAY SYSTEM

(71) Applicant: SEIKO EPSON CORPORATION, Tokyo (JP)

(72) Inventor: Takumi Oike, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 296 days.

(21) Appl. No.: 18/484,478

(22) Filed: Oct. 11, 2023

(65) Prior Publication Data
US 2024/0119574 A1  Apr. 11, 2024

(30) Foreign Application Priority Data
Oct. 11, 2022 (JP) .................................. 2022-163470

(51) Int. Cl.
*G06T 5/92* (2024.01)
*G06T 5/50* (2006.01)
(Continued)

(52) U.S. Cl.
CPC .................. *G06T 5/92* (2024.01); *G06T 5/50* (2013.01); *G06T 7/90* (2017.01); *G06V 10/56* (2022.01);
(Continued)

(58) Field of Classification Search
CPC ......... G06T 5/90–94; G06T 5/50; G06T 7/90; G06T 2207/10024; G06T 2207/20221;
(Continued)

(56) References Cited

U.S. PATENT DOCUMENTS

2013/0307995 A1* 11/2013 Nakata ................... H04N 17/00
   348/189
2014/0168525 A1*  6/2014 Hasegawa .............. G03B 21/53
   348/745
(Continued)

FOREIGN PATENT DOCUMENTS

JP   2013-238780 A   11/2013
JP   2017-083672 A    5/2017
(Continued)

OTHER PUBLICATIONS

Panasonic Corporation, Color Temperature and White Balance, Available Date: Apr. 15, 2022, 2 pages.

*Primary Examiner* — Sean T Motsinger
(74) *Attorney, Agent, or Firm* — Dority & Manning, P.A.

(57) ABSTRACT

An adjustment method includes acquiring a first captured image obtained by imaging of a range containing a first whole image and a target image, acquiring a fourth gradation value obtained by correction of a gradation value of a fourth unit image based on a gradation value of a first unit image and a gradation value of a second unit image in the first captured image, acquiring a fifth gradation value obtained by correction of a gradation value of a fifth unit image based on the gradation value of the first unit image and a gradation value of a third unit image in the first captured image, calculating a first gradation value difference as a difference between a gradation value of the target image and the fourth gradation value, calculating a second gradation value difference as a difference between the gradation value of the target image and the fifth gradation value, and correcting a displayed image using a first correction value when the first gradation value difference is equal to or larger than the second gradation value difference.

10 Claims, 7 Drawing Sheets

(51) Int. Cl.
  *G06T 7/90*    (2017.01)
  *G06V 10/56*   (2022.01)
  *G06V 10/75*   (2022.01)
(52) U.S. Cl.
  CPC .. *G06V 10/751* (2022.01); *G06T 2207/10024* (2013.01); *G06T 2207/20221* (2013.01); *G06T 2207/30168* (2013.01)
(58) Field of Classification Search
  CPC .......... G06T 2207/30168; G06V 10/56; G06V 10/751; H04N 9/3147; H04N 9/3194
  See application file for complete search history.

(56) References Cited

U.S. PATENT DOCUMENTS

| | | | |
|---|---|---|---|
| 2016/0112689 A1* | 4/2016 | Okamoto | H04N 9/3179 348/745 |
| 2017/0127028 A1* | 5/2017 | Oike | H04N 9/3185 |
| 2017/0205700 A1* | 7/2017 | Koo | F16B 47/00 |
| 2017/0208309 A1* | 7/2017 | Oike | H04N 9/315 |
| 2018/0184058 A1* | 6/2018 | Narikawa | H04N 9/3182 |
| 2020/0072672 A1* | 3/2020 | Oike | G03B 33/10 |
| 2021/0055630 A1* | 2/2021 | Oike | H04N 9/3194 |
| 2021/0168342 A1* | 6/2021 | Oike | H04N 9/3194 |
| 2022/0182519 A1* | 6/2022 | Yamauchi | G06T 7/521 |
| 2022/0201263 A1* | 6/2022 | Kagami | G06T 7/521 |
| 2023/0276036 A1* | 8/2023 | Mori | H04N 9/3185 348/745 |
| 2024/0119574 A1* | 4/2024 | Oike | G06T 5/92 |
| 2024/0137476 A1* | 4/2024 | Horikawa | H04N 9/3182 |
| 2024/0146887 A1* | 5/2024 | Furui | H04N 9/3147 |

FOREIGN PATENT DOCUMENTS

| | | |
|---|---|---|
| JP | 2017-129739 A | 7/2017 |
| JP | 2018-101968 A | 6/2018 |

\* cited by examiner

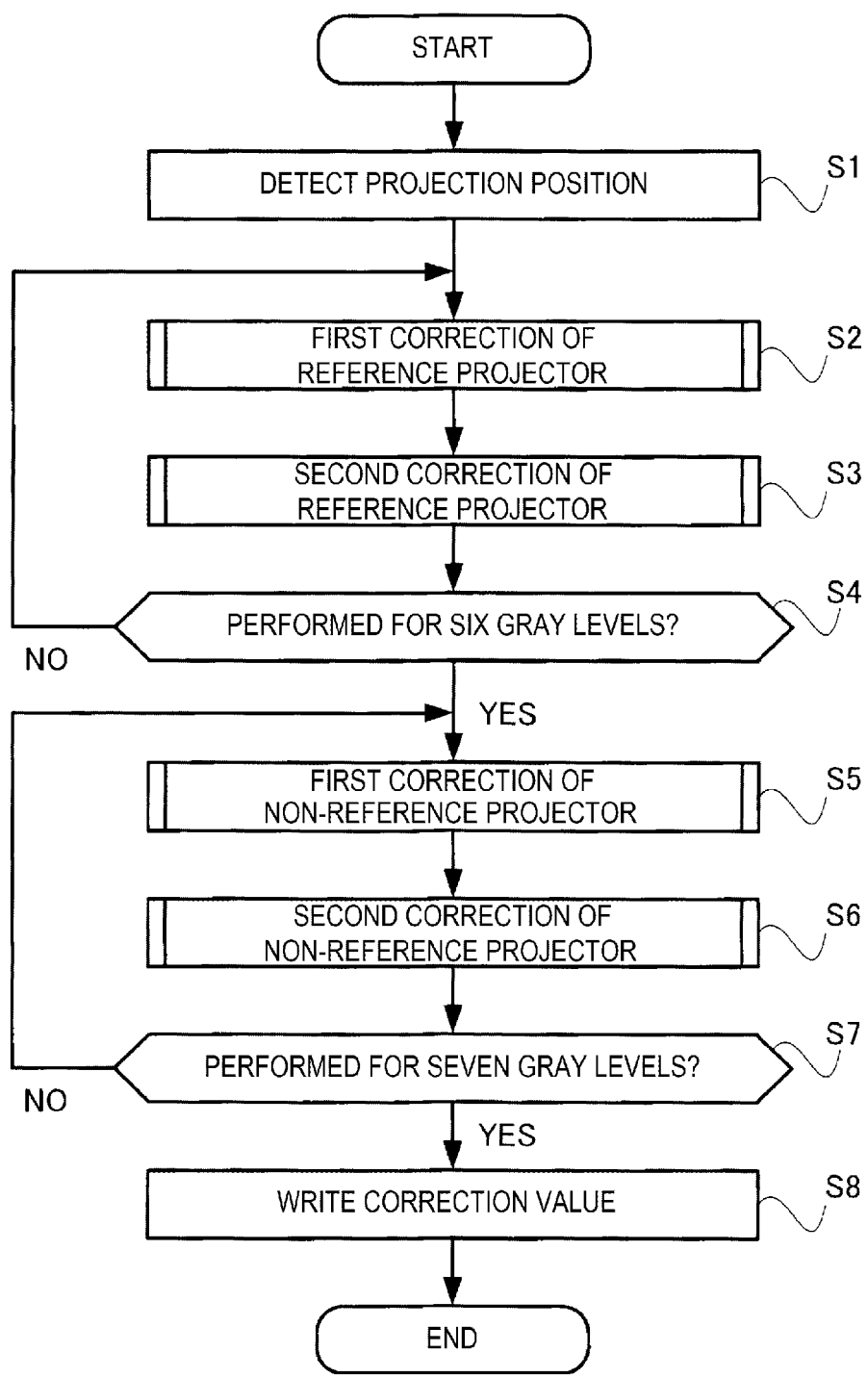

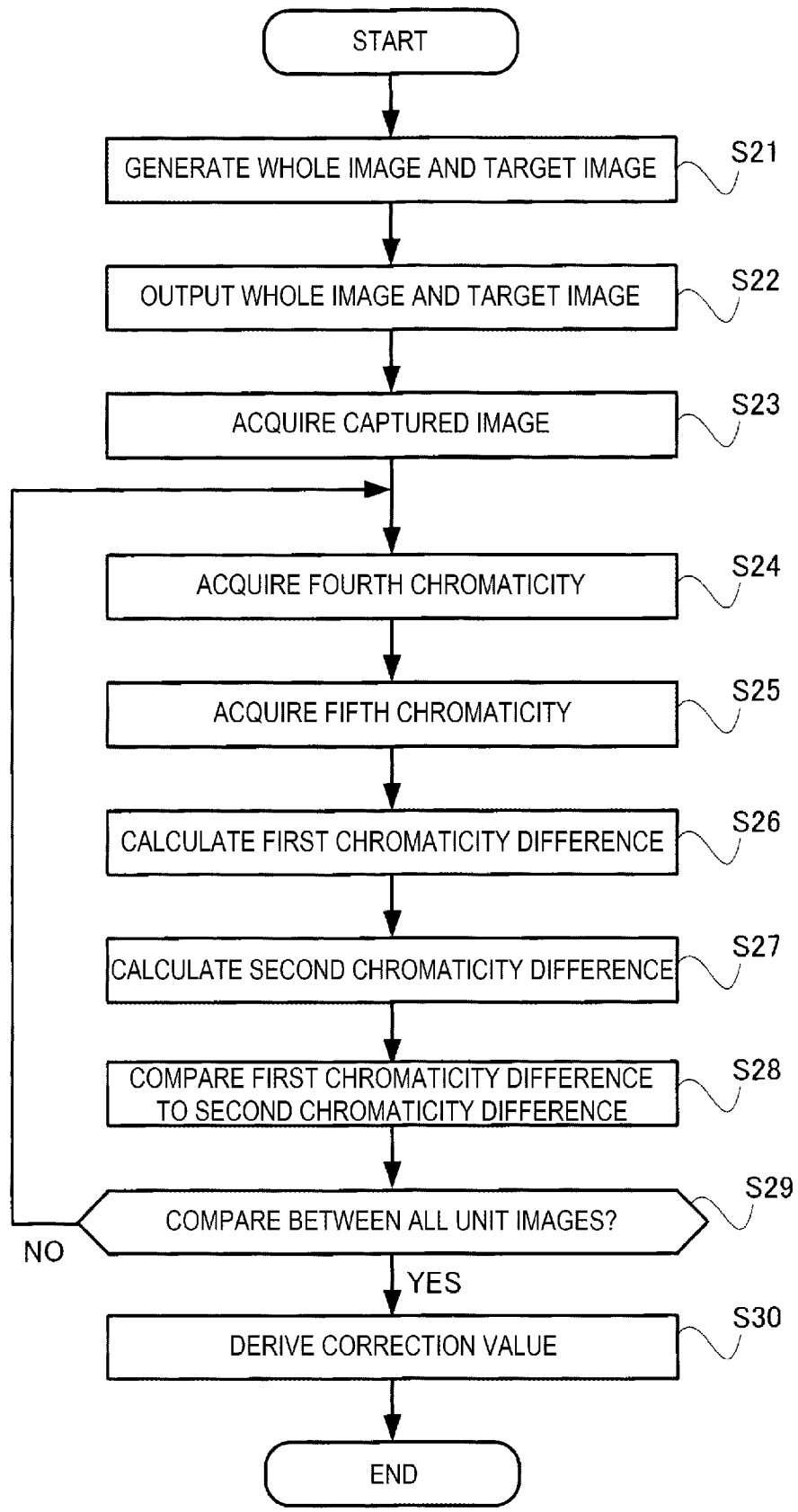

METHOD OF ADJUSTING DISPLAYED IMAGE AND DISPLAY SYSTEM

The present application is based on, and claims priority from JP Application Serial Number 2022-163470, filed Oct. 11, 2022, the disclosure of which is hereby incorporated by reference herein in its entirety.

BACKGROUND

1. Technical Field

The present disclosure relates to a method of adjusting a displayed image and a display system.

2. Related Art

When multi-projection using a plurality of projectors is executed, for solving individual differences in shades of colors of screens for projection among the projectors, a technique of correcting the shades of colors of the screens using captured images obtained by imaging of the projection screens may be utilized.

For example, JP-A-2017-129739 discloses a technique of projecting raster images in single colors of red, green, and blue prepared with respect to each of predetermined gradations one by one, imaging the projected raster images, and correcting shades of colors of the projected images based on the imaging results.

However, in the technique according to JP-A-2017-129739, it is necessary to repeat imaging of the single-color raster images with brightness variations. As a result, the number of imaging patterns is larger, and there is a problem that the adjustment time is longer and user's convenience is lower.

SUMMARY

A method of adjusting a displayed image according to an aspect of the present disclosure includes displaying, by a first display apparatus, a first whole image including a first unit image located in a first area and having a first gradation value, a second unit image located in a second area and having the first gradation value, a third unit image located in a third area and having the first gradation value, a fourth unit image located in a fourth area and having a second gradation value different from the first gradation value, and a fifth unit image located in a fifth area and having a third gradation value different from the first gradation value and the second gradation value, a distance from the second area to the fourth area being equal to or shorter than a distance from the first area to the fourth area, the distance from the second area to the fourth area being equal to or shorter than a distance from the second area to the fifth area, a distance from the third area to the fifth area being equal to or shorter than a distance from the first area to the fifth area, and the distance from the third area to the fifth area being equal to or shorter than a distance from the third area to the fourth area, acquiring a first captured image obtained by imaging of a range containing the first whole image and a target image as a target of a correction of the gradation value, acquiring a fourth gradation value obtained by correction of the gradation value of the fourth unit image in the first captured image based on the gradation value of the first unit image and the gradation value of the second unit image in the first captured image, acquiring a fifth gradation value obtained by correction of the gradation value of the fifth unit image in the first captured image based on the gradation value of the first unit image and the gradation value of the third unit image in the first captured image, calculating a first gradation value difference as a difference between a gradation value of the target image and the fourth gradation value in the first captured image, calculating a second gradation value difference as a difference between the gradation value of the target image and the fifth gradation value in the first captured image, and correcting a displayed image displayed by the first display apparatus using a first correction value when the first gradation value difference is equal to or larger than the second gradation value difference, and correcting the displayed image displayed by the first display apparatus using a second correction value when the first gradation value difference is smaller than the second gradation value difference.

A display system according to an aspect of the present disclosure includes a first display apparatus displaying a first whole image including a first unit image located in a first area and having a first gradation value, a second unit image located in a second area and having the first gradation value, a third unit image located in a third area and having the first gradation value, a fourth unit image located in a fourth area and having a second gradation value different from the first gradation value, and a fifth unit image located in a fifth area and having a third gradation value different from the first gradation value and the second gradation value, a distance from the second area to the fourth area being equal to or shorter than a distance from the first area to the fourth area, the distance from the second area to the fourth area being equal to or shorter than a distance from the second area to the fifth area, a distance from the third area to the fifth area being equal to or shorter than a distance from the first area to the fifth area, and the distance from the third area to the fifth area being equal to or shorter than a distance from the third area to the fourth area, an imaging apparatus generating a first captured image by imaging a range containing the first whole image and a target image as a target of a correction of the gradation value, and an information processing apparatus executing acquiring the first captured image, acquiring a fourth gradation value obtained by correction of the gradation value of the fourth unit image in the first captured image based on the gradation value of the first unit image and the gradation value of the second unit image in the first captured image, acquiring a fifth gradation value obtained by correction of the gradation value of the fifth unit image in the first captured image based on the gradation value of the first unit image and the gradation value of the third unit image in the first captured image, calculating a first gradation value difference as a difference between a gradation value of the target image and the fourth gradation value in the first captured image, calculating a second gradation value difference as a difference between the gradation value of the target image and the fifth gradation value in the first captured image, and correcting a displayed image displayed by the first display apparatus using a first correction value when the first gradation value difference is equal to or larger than the second gradation value difference, and correcting the displayed image displayed by the first display apparatus using a second correction value when the first gradation value difference is smaller than the second gradation value difference.

A display system according to another aspect of the present disclosure includes a first display apparatus displaying a first whole image including a first unit image located in a first area and having a first gradation value, a second unit image located in a second area and having the first gradation value, a third unit image located in a third area and having the first gradation value, a fourth unit image located in a fourth area and having a second gradation value different from the first gradation value, and a fifth unit image located in a fifth area and having a third gradation value different from the first gradation value and the second gradation value, a distance from the second area to the fourth area being equal to or shorter than a distance from the first area to the fourth area, the distance from the second area to the fourth area being equal to or shorter than a distance from the second area to the fifth area, a distance from the third area to the fifth area being equal to or shorter than a distance from the first area to the fifth area, and the distance from the third area to the fifth area being equal to or shorter than a distance from the third area to the fourth area, a second display apparatus displaying a target image as a target of a correction of the gradation value, an imaging apparatus generating a first captured image by imaging a range containing the first whole image and the target image, and an information processing apparatus executing acquiring the first captured image, acquiring a fourth gradation value obtained by correction of the gradation value of the fourth unit image in the first captured image based on the gradation value of the first unit image and the gradation value of the second unit image in the first captured image, acquiring a fifth gradation value obtained by correction of the gradation value of the fifth unit image in the first captured image based on the gradation value of the first unit image and the gradation value of the third unit image in the first captured image, calculating a first gradation value difference as a difference between a gradation value of the target image and the fourth gradation value in the first captured image, calculating a second gradation value difference as a difference between the gradation value of the target image and the fifth gradation value in the first captured image, and correcting a displayed image displayed by the first display apparatus using a first correction value when the first gradation value difference is equal to or larger than the second gradation value difference, and correcting the displayed image displayed by the first display apparatus using a second correction value when the first gradation value difference is smaller than the second gradation value difference.

An information processing program according to an aspect of the present disclosure is for controlling a computer to execute displaying, by a first display apparatus, a first whole image including a first unit image located in a first area and having a first gradation value, a second unit image located in a second area and having the first gradation value, a third unit image located in a third area and having the first gradation value, a fourth unit image located in a fourth area and having a second gradation value different from the first gradation value, and a fifth unit image located in a fifth area and having a third gradation value different from the first gradation value and the second gradation value, a distance from the second area to the fourth area being equal to or shorter than a distance from the first area to the fourth area, the distance from the second area to the fourth area being equal to or shorter than a distance from the second area to the fifth area, a distance from the third area to the fifth area being equal to or shorter than a distance from the first area to the fifth area, and the distance from the third area to the fifth area being equal to or shorter than a distance from the third area to the fourth area, acquiring a first captured image obtained by imaging of a range containing the first whole image and a target image as a target of a correction of the gradation value by an imaging apparatus, acquiring the first captured image, acquiring a fourth gradation value obtained by correction of the gradation value of the fourth unit image in the first captured image based on the gradation value of the first unit image and the gradation value of the second unit image in the first captured image, acquiring a fifth gradation value obtained by correction of the gradation value of the fifth unit image in the first captured image based on the gradation value of the first unit image and the gradation value of the third unit image in the first captured image, calculating a first gradation value difference as a difference between a gradation value of the target image and the fourth gradation value in the first captured image, calculating a second gradation value difference as a difference between the gradation value of the target image and the fifth gradation value in the first captured image, and correcting a displayed image displayed by the first display apparatus using a first correction value when the first gradation value difference is equal to or larger than the second gradation value difference, and correcting the displayed image displayed by the first display apparatus using a second correction value when the first gradation value difference is smaller than the second gradation value difference.

BRIEF DESCRIPTION OF THE DRAWINGS

FIG. 6 is a flowchart showing an operation of the information processing apparatus 10.

FIG. 7 is a flowchart showing the operation of the information processing apparatus 10.

DESCRIPTION OF EMBODIMENTS

As below, embodiments for implementation of the present disclosure will be explained with reference to the drawings. Note that, in the respective drawings, dimensions and scales of the respective parts are appropriately made different from real ones. Further, the following embodiments are preferable specific examples of the present disclosure and various technically preferable limitations are imposed thereon. However, the scope of the present disclosure is not limited to these embodiments unless there is particular description limiting the present disclosure in the following explanation.

1: First Embodiment 1-1: Overall Configuration

Figure 1:
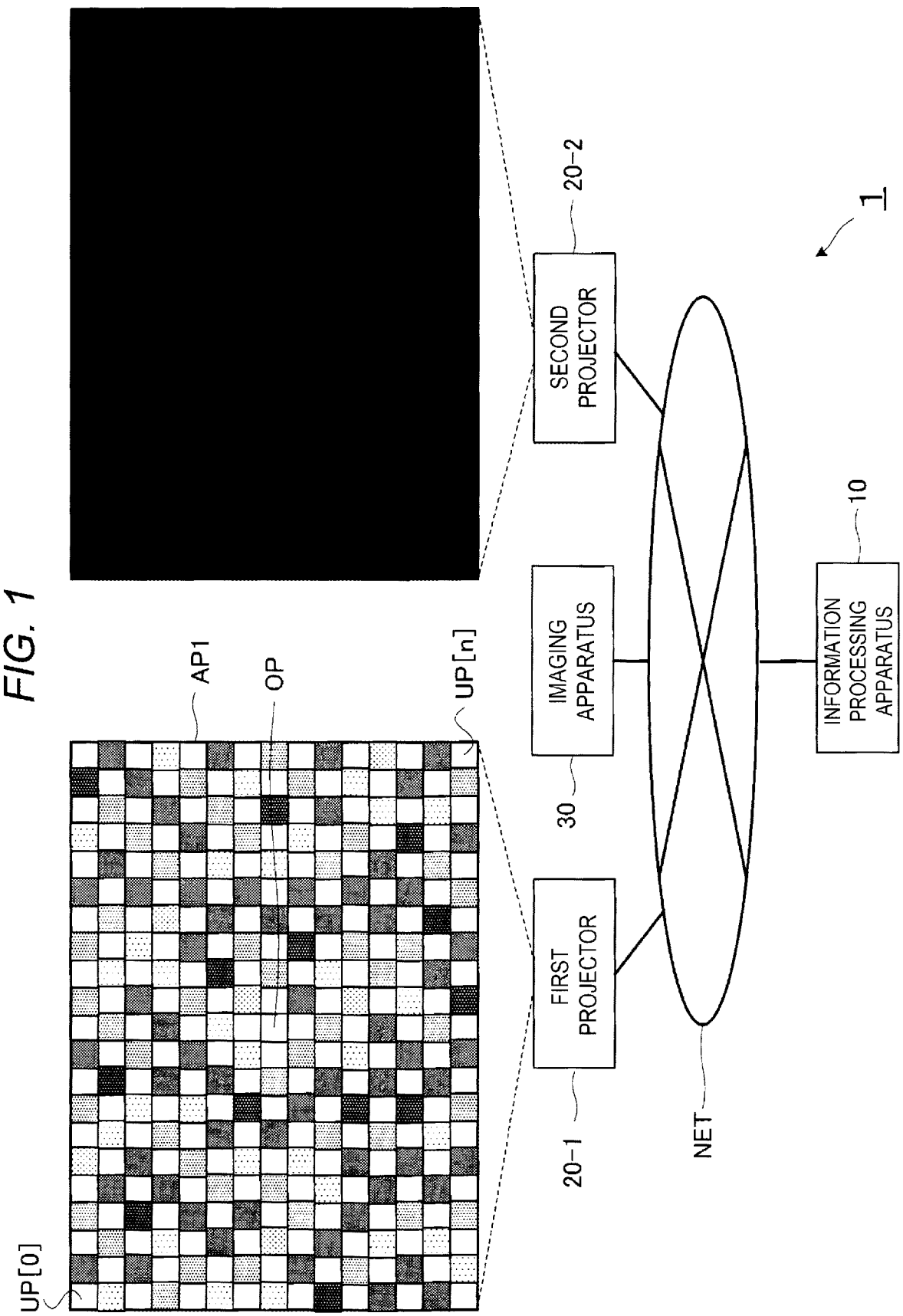
FIG. 1 is a block diagram showing a configuration of a display system 1.
Figure 2:
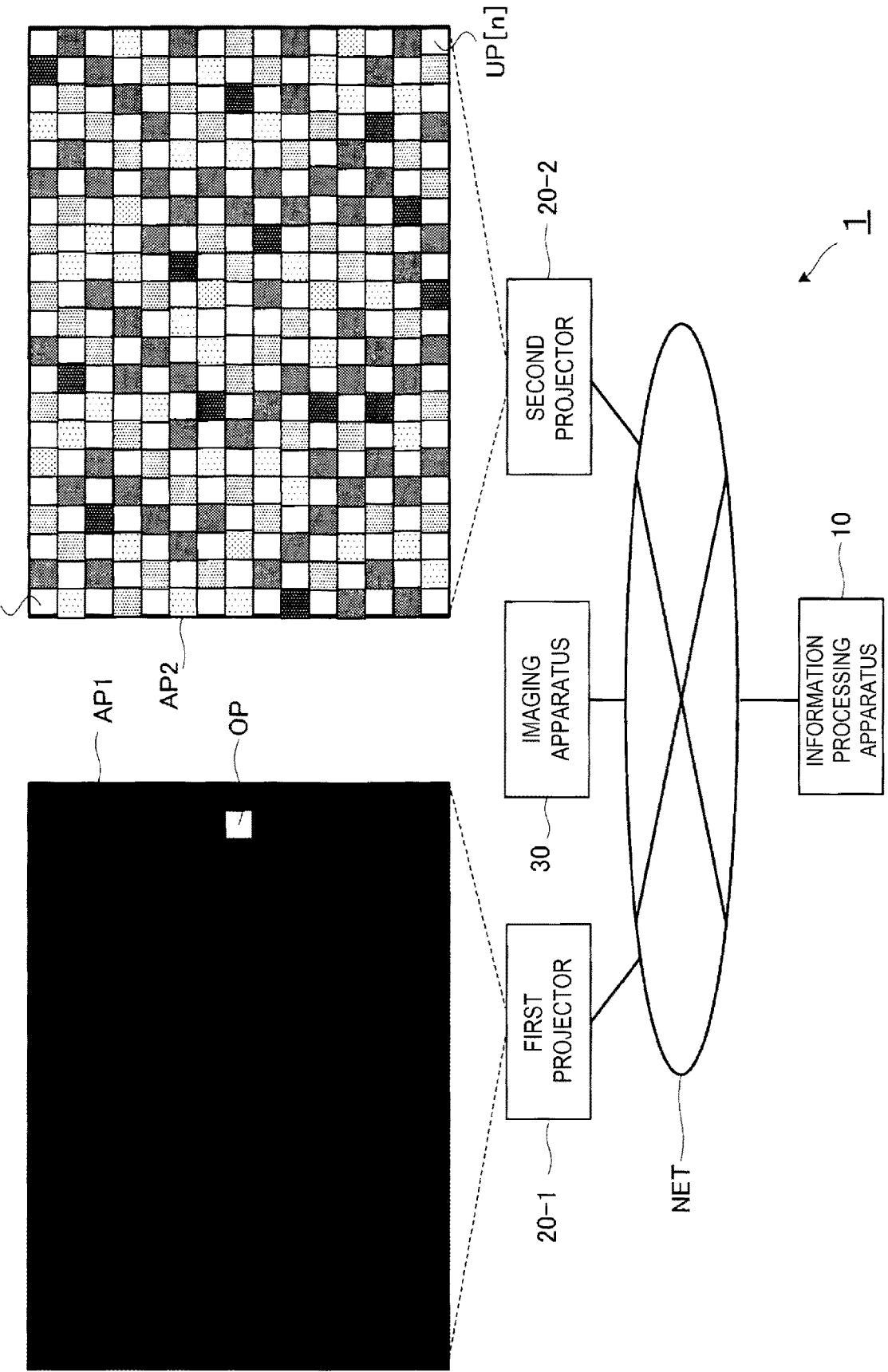
FIG. 2 is a block diagram showing the configuration of the display system 1.

FIGS. 1 and 2 are block diagrams showing a configuration of a display system 1 according to a first embodiment. The display system 1 includes an information processing apparatus 10, a first projector 20-1, a second projector 20-2, and an imaging apparatus 30. The information processing apparatus 10, the first projector 20-1, the second projector 20-2, and the imaging apparatus are communicably coupled to one another via a communication network NET.

For example, the first projector 20-1 and the second projector 20-2 display displayed images by projecting projected images on a wall surface or a screen. The imaging apparatus 30 captures the displayed image displayed on the wall surface or the screen by the first projector 20-1 and the displayed image displayed on the wall surface or the screen by the second projector 20-2. Further, the imaging apparatus 30 outputs the captured captured images to the information processing apparatus 10. The imaging apparatus 30 captures various images under control of the information processing apparatus 10. For example, cameras provided in a PC, a tablet terminal, and a smartphone are preferably used as the imaging apparatus 30, however, the imaging apparatus is not limited to those. An external camera such as a WEB camera may be used. The information processing apparatus 10 calculates color correction values of the first projector 20-1 and the second projector 20-2 using the captured images acquired from the imaging apparatus 30. For example, a PC, a tablet terminal, and a smartphone are preferably used as the information processing apparatus 10, however, the apparatus is not limited to those. Note that, in FIG. 1, the first projector 20-1 and the second projector 20-2 as the two projectors are shown, however, the projectors are just examples. The display system 1 can include an arbitrary number of projectors 20.

In the display system 1, as shown in FIG. 1, first, the first projector 20-1 projects a target image OP having a target gradation value and a whole image AP1. The whole image AP1 includes unit images UP having a plurality of gradation values at gradations shifted from the gradation value of the target image OP, i.e., a plurality of unit images UP[0] to UP[n] (n is an integer equal to or larger than 1) each having a single gradation value. In the example shown in FIG. 1, the target image OP is displayed to be superimposed on the whole image AP1. Then, the information processing apparatus 10 calculates a correction value for correction of the gradation value of the first projector 20-1 based on the imaging results of the target image OP and the whole image AP1 by the imaging apparatus 30. Note that, in FIG. 1, the first projector 20-1 is an example of "first display apparatus". Further, the whole image AP1 is an example of "first whole image".

Then, as shown in FIG. 2, in the display system 1, the first projector 20-1 with the corrected gradation value projects the target image OP having the target gradation value. Further, the second projector 20-2 projects a whole image AP2. The whole image AP2 includes unit images UP having a plurality of gradation values at gradations shifted from the gradation value of the target image OP, i.e., a plurality of unit images UP[0] to UP[n](n is an integer equal to or larger than 1) each having a single gradation value. Then, the information processing apparatus 10 calculates a correction value for correction of the gradation value of the second projector 20-2 based on the imaging results of the target image OP and the whole image AP2 by the imaging apparatus 30. Note that, in FIG. 2, the second projector 20-2 is an example of "first display apparatus". On the other hand, the first projector 20-1 is an example of "second display apparatus". Further, the whole image AP2 is an example of "first whole image". The whole image AP1 is an example of "second whole image". The whole image AP1 and the whole image AP2 may be the same image or different images. Furthermore, the positions of the unit images UP[0] to UP[n] in the whole images AP1 and AP2 are arbitrary.

1-2: Configuration of Projector

Figure 3:
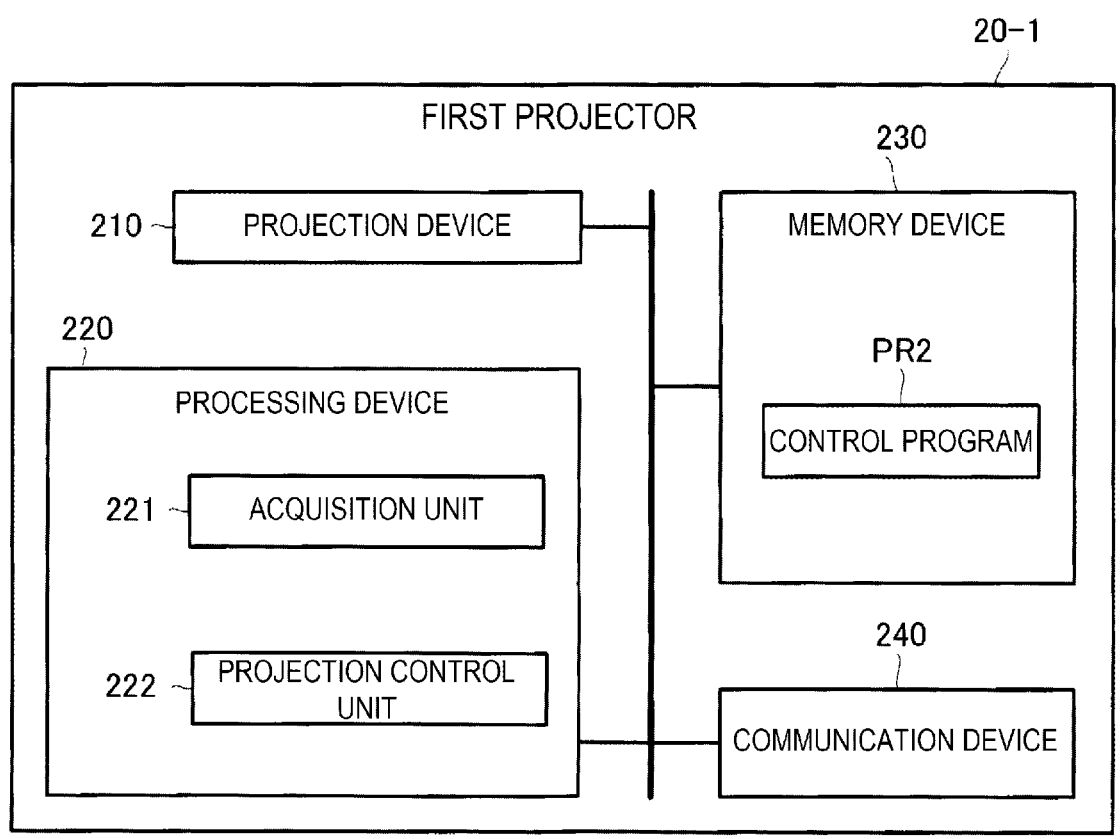
FIG. 3 is a block diagram showing a configuration of a first projector 20-1.

FIG. 3 is a block diagram showing a configuration of the first projector 20-1. The first projector 20-1 includes a projection device 210, a processing device 220, a memory device 230, and a communication device 240. The respective elements of the first projector 20-1 are coupled to one another via one or more buses for communication of information. Further, the respective elements of the first projector 20-1 are formed by one or more devices and part of the elements of the first projector 20-1 may be omitted. Note that the second projector 20-2 has the same configuration as the first projector 20-1 and the illustration thereof is omitted.

The projection device 210 is a device projecting the target image OP and the whole image AP1 acquired from the information processing apparatus 10 by an acquisition unit 221, which will be described later, on a wall or a screen. The projection device 210 projects various images under control of the processing device 220. The projection device 210 includes e.g., a light source, a liquid crystal panel, and a projection lens and modulates light from the light source using a liquid crystal panel. Further, the projection device 210 projects the modulated light on the screen, the wall, or the like via a projection lens. The configuration of the projection device 210 including the liquid crystal panel is exemplified, however, the device is not limited to that. For example, the device may include a digital mirror device. The projection device 210 may only project the target image OP and the whole image AP1 on the wall or the screen.

The processing device 220 is a processor controlling the entire of the first projector 20-1 and includes e.g., one or more chips. The processing device 220 includes a central processing unit (CPU) containing e.g., an interface with a peripheral device, a calculation device, a register, etc. Note that part or all of the functions of the processing device 220 may be realized by hardware including a DSP (Digital Signal Processor), an ASIC (Application Specific Integrated Circuit), a PLD (Programmable Logic Device), and an FPGA (Field Programmable Gate Array). The processing device 220 executes various kinds of processing in parallel or sequence.

The memory device 230 is a storage medium readable by the processing device 220 and stores a plurality of programs including a control program PR2 executed by the processing device 220. The memory device 230 includes at least one of e.g., a ROM (Read Only Memory), an EPROM (Erasable Programmable ROM), an EEPROM (Electrically Erasable Programmable ROM), and a RAM (Random Access Memory) The memory device 230 may be called a register, a cache, a main memory, a main storage device, or the like.

The communication device 240 is hardware as a transmitting and receiving device for communication with the other devices. The communication device 240 is also called e.g., a network device, a network controller, a network card, a communication module, or the like. The communication device 240 may include a connector for wired coupling and an interface circuit corresponding to the connector. Further, the communication device 240 may include a wireless communication interface. The connector for wired coupling and the interface circuit include a connecter and an interface circuit compliant to wired LAN, IEEE 1394, and USB. The wireless communication interface includes an interface compliant to wireless LAN and Bluetooth (registered trademark).

The processing device 220 reads and executes the control program PR2 from the memory device 230, and thereby, functions as the acquisition unit 221 and a projection control unit 222. Note that the control program PR2 may be transmitted from another device such as a server managing the first projector 20-1 via the communication network NET.

The acquisition unit 221 acquires the target image OP and the whole image AP1 from the information processing apparatus 10 via the communication device 240.

The projection control unit 222 projects the target image OP and the whole image AP1 acquired by the acquisition unit 221 on the wall or the screen using the projection device 210.

Note that, though not illustrated, the first projector 20-1 has other functions provided in a normal projector.

1-3: Configuration of Information Processing Apparatus

Figure 4:
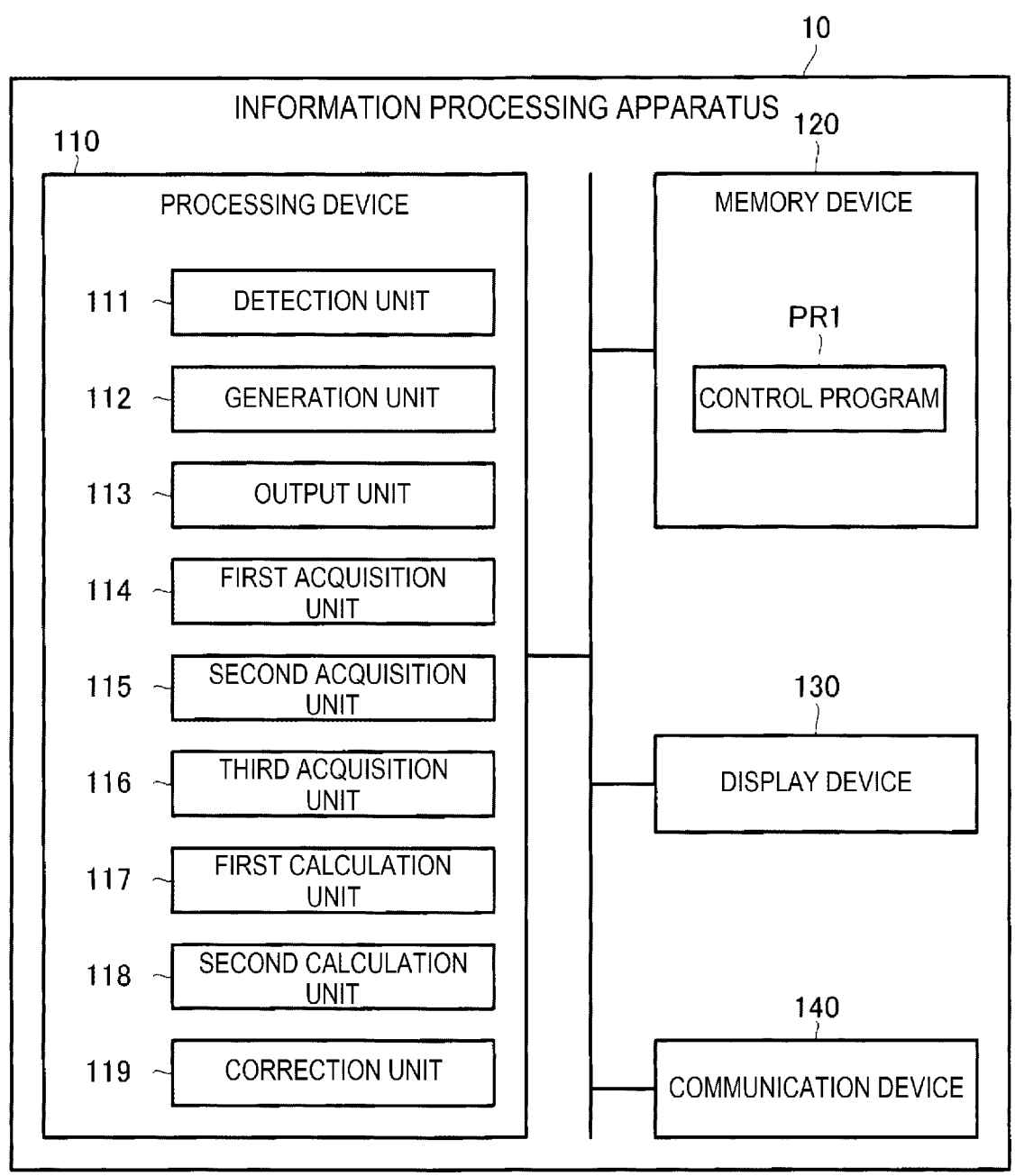
FIG. 4 is a block diagram showing a configuration example of an information processing apparatus 10.

FIG. 4 is a block diagram showing a configuration example of the information processing apparatus 10. The information processing apparatus 10 is a PC as a typical example, however, not limited to that. For example, the apparatus may be e.g., a tablet terminal or a smartphone. The information processing apparatus 10 includes a processing device 110, a memory device 120, a display apparatus 130, and a communication device 140. The respective elements of the information processing apparatus 10 are coupled to one another via one or more buses for communication of information.

The processing device 110 is a processor controlling the entire of the information processing apparatus 10 and includes e.g., one or more chips. The processing device 110 includes a central processing unit (CPU) containing e.g., an interface with a peripheral device, a calculation device, a register, etc. Note that part or all of the functions of the processing device 110 may be realized by hardware including a DSP (Digital Signal Processor), an ASIC (Application Specific Integrated Circuit), a PLD (Programmable Logic Device), and an FPGA (Field Programmable Gate Array). The processing device 110 executes various kinds of processing in parallel or sequence.

The memory device 120 is a storage medium readable and writable by the processing device 110 and stores a plurality of programs including a control program PR1 executed by the processing device 110. Further, the memory device 120 may store images projected by the first projector 20-1 and the second projector 20-2. Furthermore, the memory device 120 may store layout information relating to placement of the first projector 20-1 and the second projector 20-2. The memory device 120 includes at least one of e.g., a ROM (Read Only Memory), an EPROM (Erasable Programmable ROM), an EEPROM (Electrically Erasable Programmable ROM), and a RAM (Random Access Memory). The memory device 120 may be called a register, a cache, a main memory, a main storage device, or the like.

The display apparatus 130 is a device displaying images and character information. The display apparatus 130 displays various images under control of the processing device 110. For example, various display panels including a liquid crystal display panel and an organic EL (Electro Luminescence) display panel are preferably used as the display apparatus 130.

The communication device 140 is hardware as a transmitting and receiving device for communication with the other devices. The communication device 140 is also called e.g., a network device, a network controller, a network card, a communication module, or the like. The communication device 140 may include a connector for wired coupling and an interface circuit corresponding to the connector. Further, the communication device 140 may include a wireless communication interface. The connector for wired coupling and the interface circuit include a connecter and an interface circuit compliant to wired LAN, IEEE 1394, and USB. The wireless communication interface includes an interface compliant to wireless LAN and Bluetooth (registered trademark).

The processing device 110 reads and executes the control program PR1 from the memory device 120, and thereby, functions as a detection unit 111, a generation unit 112, an output unit 113, a first acquisition unit 114, a second acquisition unit 115, a third acquisition unit 116, a first calculation unit 117, a second calculation unit 118, and a correction unit 119. Note that the control program PR1 may be transmitted from another device such as a server managing the information processing apparatus 10 via the communication network NET.

The detection unit 111 detects a projection position of the projected image by the first projector 20-1 on the wall or the screen. Specifically, the detection unit 111 controls the first projector 20-1 to project a dot pattern or a chessboard pattern. Further, the detection unit 111 acquires information representing where the respective portions within the projected image projected by the first projector 20-1 appear in camera pixels of the imaging apparatus 30. Furthermore, the detection unit 111 detects the position of the projected image projected by the first projector 20-1 in a camera coordinate system within the imaging apparatus 30 based on the acquired information. Similarly, the detection unit 111 detects the projection position of the projected image by the second projector 20-2 on the wall or the screen.

The generation unit 112 generates the target image OP and the whole images AP1 and AP2.

Figure 5:
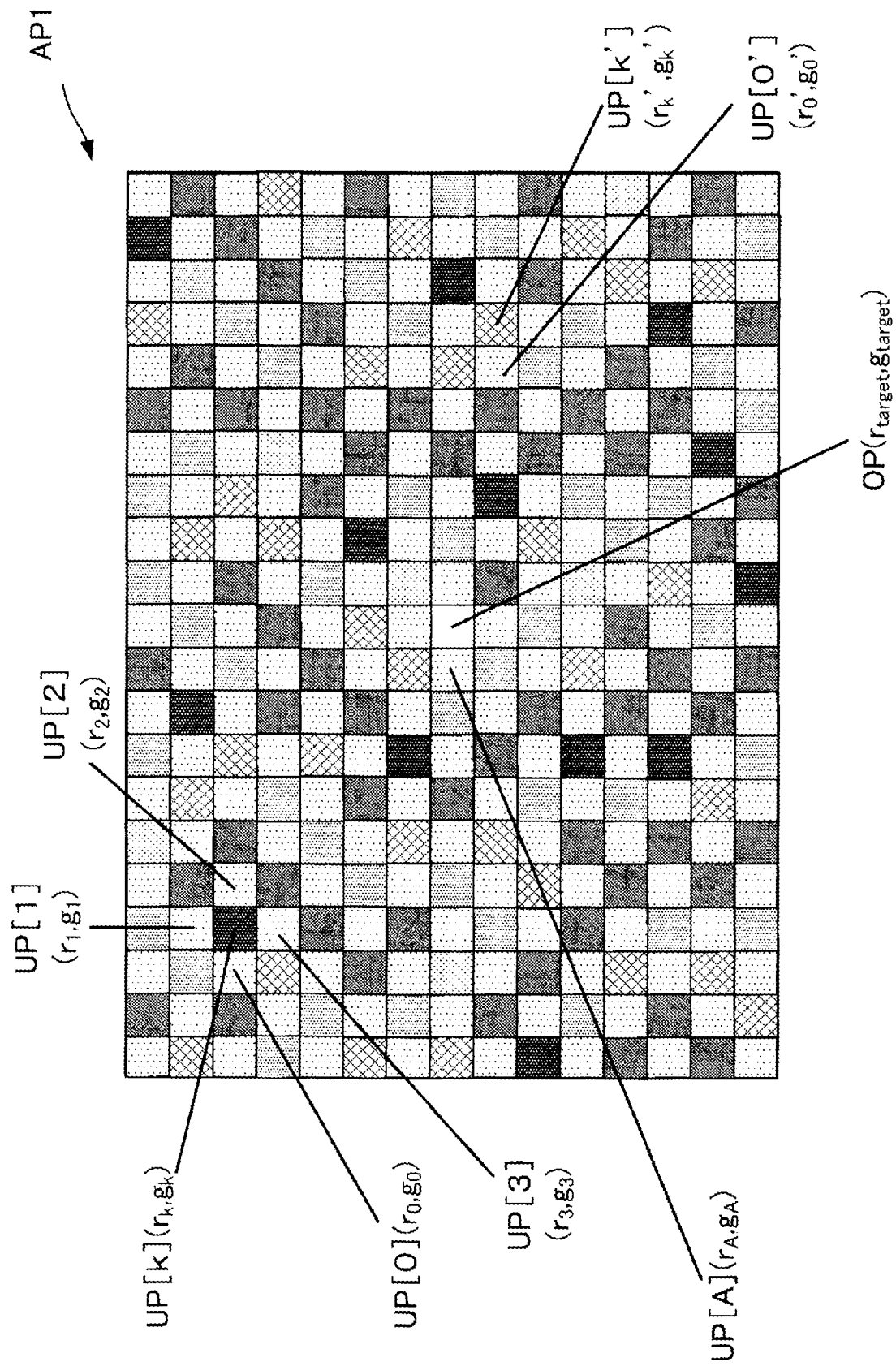
FIG. 5 shows a captured image of a whole image AP1.

FIG. 5 shows examples of the target image OP and the whole image AP1. In the examples shown in FIG. 5, the whole image AP1 includes a plurality of unit images UP. Further, the plurality of unit images UP include a unit image UP[A], a unit image UP[0], a unit image UP[0'], a unit image UP[k], and a unit image UP[k']. Here, the unit image UP[A] is an example of "first unit image". The unit image UP[0] is an example of "second unit image". The unit image UP[0'] is an example of "third unit image". The unit image UP[k] is an example of "fourth unit image". The unit image UP[k'] is an example of "fifth unit image".

Further, in the whole image AP1, an area where the unit image UP[A] is located is referred to as "first area". Similarly, in the whole image AP1, an area where the unit image UP[0] is located is referred to as "second area". In the whole image AP1, an area where the unit image UP[0'] is located is referred to as "third area". In the whole image AP1, an area where the unit image UP[k] is located is referred to as "fourth area". In the whole image AP1, an area where the unit image UP[k'] is located is referred to as "fifth area". Here, the second area and the fourth area are located at a short distance to each other. Specifically, the distance from the second area to the fourth area is equal to or shorter than the distance from the first area to the fourth area. Further, the distance from the second area to the fourth area is equal to or shorter than the distance from the second area to the fifth area. Similarly, the third area and the fifth area are located at a short distance to each other. Specifically, the distance from the third area to the fifth area is equal to or shorter than the distance from the first area to the fifth area. Further, the distance from the third area to the fifth area is equal to or shorter than the distance from the third area to the fourth area.

The target image OP is located in a sixth area near the center of the whole image AP1. Specifically, the distance from the center position to the sixth area of the whole image AP1 is shorter than the distance from the center position to the first area of the whole image AP1. Further, the distance from the center position to the sixth area of the whole image AP1 is shorter than the distance from the center position to the second area of the whole image AP1. The distance from the center position to the sixth area of the whole image AP1 is shorter than the distance from the center position to the third area of the whole image AP1. The distance from the center position to the sixth area of the whole image AP1 is shorter than the distance from the center position to the fourth area of the whole image AP1. The distance from the center position to the sixth area of the whole image AP1 is shorter than the distance from the center position to the fifth area of the whole image AP1.

In addition, the unit image UP[A], the unit image UP[0], and the unit image UP[0'] have "first gradation value" as the same gradation value. On the other hand, the unit image UP[k] has "second gradation value" different from "first gradation value". Further, the unit image UP[k'] has "third gradation value" different from "first gradation value" or "second gradation value".

In FIG. 4, the output unit 113 outputs the target image OP and the whole image AP1 to the first projector 20-1. Further, the output unit 113 outputs the whole image AP2 to the second projector 20-2. Note that the output unit 113 outputting the target image OP and the whole image AP1 to the first projector 20-1 is an example of "controlling the first display apparatus to display" the target image OP and the whole image AP1. Similarly, the output unit 113 outputting the target image OP and the whole image AP2 to the second projector 20-2 is an example of "controlling the second display apparatus to display" the target image OP and the whole image AP2.

The first acquisition unit 114 acquires a captured image obtained by imaging of a range containing the whole image AP1 and the target image OP captured by the imaging apparatus 30. The captured image acquired by the first acquisition unit 114 is an example of "first captured image".

Here, when RGB values of each pixel in the captured image captured by the imaging apparatus 30 are ($R_{camera}$, $G_{camera}$, $B_{camera}$), gradation values r, g of each unit image UP forming the whole image AP1 are calculated by the following equations $$r = R_{camera}/(R_{camera}+G_{camera}+B_{camera}) \quad \text{Eq. (1)}$$

$$g = G_{camera}/(R_{camera}+G_{camera}+B_{camera}) \quad \text{Eq. (2)}$$

The RGB value indicating chromaticity is an example of the gradation value.

The second acquisition unit 115 acquires a gradation value obtained by correction of the gradation value of the unit image UP[k] based on the gradation value of the unit image UP[A] and the gradation value of the unit image UP[0] in the first captured image. The corrected gradation value is an example of "fourth gradation value".

When the gradation value r of the unit image UP[0] is $r_0$, the gradation value r of the unit image UP[A] is $r_A$, the gradation value r of the unit image UP[k] before correction is $r_k$, and the fourth gradation value as the gradation value r after correction is $r_{k2} = r_k + \Delta r_k$ in the captured image, $\Delta r_k$ is expressed by the following equation $$\Delta r_k = r_0 - r_A \quad \text{Eq. (3)}.$$

That is, the fourth gradation value $r_{k2}$ is the following value $$r_{k2} = r_k + \Delta r_k = r_k + r_0 - r_A \quad \text{Eq. (4)}.$$

Similarly, when the gradation value g of the unit image UP[0] is $g_0$, the gradation value g of the unit image UP[A] is $g_A$, the gradation value r of the unit image UP[k] is $g_k$, and the fourth gradation value as the gradation value g after the correction is $g_{k2} = g_k + \Delta g_k$ in the captured image, $\Delta g_k$ is expressed by the following equation $$\Delta g_k = g_0 - g_A \quad \text{Eq. (5)}.$$

That is, the fourth gradation value $g_{k2}$ is the following value $$g_{k2} = g_k + \Delta g_k = g_k + g_0 - g_A \quad \text{Eq. (6)}.$$

Note that Eq. (3) to Eq. (6) are just examples and the mathematical equations for calculation of $\Delta r_k$, $r_{k2}$, $\Delta g_k$, $g_{k2}$ are not limited to those. In the captured image of the whole image AP1 exemplified in FIG. 5, the unit image on the left next to the unit image UP[k] is the unit image UP[0]. The image on the upside next to the unit image UP[k] is the unit image UP[1]. The unit image on the right next to the unit image UP[k] is the unit image UP[2]. The image on the downside next to the unit image UP[k] is the unit image UP[3]. Further, the gradation value r of the unit image UP[0] is $r_0$ and the gradation value g is $g_0$. Similarly, the gradation value r of the unit image UP[1] is $r_1$ and the gradation value g is $g_1$. The gradation value r of the unit image UP[2] is $r_2$ and the gradation value g is $g_2$. The gradation value r of the unit image UP[3] is $r_3$ and the gradation value g is $g_3$. Here, in place of $r_0$ in Eq. (3) and Eq. (4), an average value of $r_0$, $r_1$, $r_2$, and $r_3$ may be used. Similarly, in pace of $r_0$ in Eq. (5) and Eq. (6), and average value of $g_0$, $g_1$, $g_2$, and $g_3$ may be used.

Note that, if the unit image UP[k] is indicated by the position of the unit image UP[A], the gradation values $r_{k2}$, $g_{k2}$ obtained by Eq. (4) and Eq. (6) refer to gradation values of the unit image UP[k] measured in the first captured image.

In FIG. 4, the third acquisition unit 116 acquires a gradation value obtained by correction of the gradation value of the unit image UP[k'] based on the gradation value of the unit image UP[A] and the gradation value of the unit image UP[0'] in the first captured image. The corrected gradation value is an example of "fifth gradation value". Note that the method of calculating the fifth gradation value acquired by the third acquisition unit 116 is the same as the method of calculating the fourth gradation value acquired by the second acquisition unit 115 and the explanation thereof is omitted.

The first calculation unit 117 calculates a gradation value difference $\Delta rg_1$ as a difference between the gradation value of the target image OP in the first captured image and the fourth gradation value. The gradation value difference is an example of "first gradation value difference".

When the gradation value r of the target image OP in the first captured image is $r_{target}$ and the gradation value g is $g_{target}$, the first gradation value difference $\Delta rg_1$ is calculated by the following Eq. (7)

$$\Delta rg_1 = \sqrt{(r_{k2}-r_{target})^2 + (g_{k2}-g_{target})^2} \quad \text{Eq. (7)}$$

The second calculation unit 118 calculates a gradation value difference $\Delta rg_2$ as a difference between the gradation value of the target image OP in the first captured image and the fifth gradation value. The gradation value difference is an example of "second gradation value difference". Note that the method of calculating the second gradation value difference $\Delta rg_2$ by the second calculation unit 118 is the same as the method of calculating the first gradation value difference $\Delta rg_1$ by the first calculation unit 117 and the explanation thereof is omitted.

When the first gradation value difference $\Delta rg_1$ is equal to or larger than the second gradation value difference $\Delta rg_2$, the calculation unit 119 corrects the displayed image by the first projector 20-1 using an amount of a difference between the gradation value of the target image OP and the third gradation value as the gradation value of the unit image UP[k'] as the fifth unit image in the whole image AP as the projected image as a correction value. The correction value is an example of "first correction value". Or, when the first gradation value difference $\Delta rg_1$ is smaller than the second gradation value difference $\Delta rg_2$, the calculation unit 119 corrects the displayed image by the first projector 20-1 using an amount of a difference between the gradation value of the target image OP and the second gradation value as the gradation value of the unit image UP[k] as the fourth unit image in the whole image AP as the projected image as a correction value. The correction value is an example of "second correction value".

Note that, for simplification of explanation, in the above described explanation, the correction unit 119 derives the correction value for correction of the displayed image by the first projector 20-1 by comparing only the gradation values of the two unit images UP of the unit image UP[k] as the fourth unit image and the unit image UP[k'] as the fifth unit image. However, in practice, the correction unit 119 executes the same calculation with respect to all unit images UP forming the whole image AP and obtains the unit image UP having the smallest arg. Then, the correction unit 119 obtains an amount of a difference between the gradation value of the target image OP and the obtained gradation value in the unit image UP as a correction value.

Further, the information processing apparatus 10 may divide the gradation displayed by the first projector 20-1 into a plurality of levels using a plurality of thresholds and execute the above described correction processing with respect to each gradation. Furthermore, the information processing apparatus 10 may execute the same correction processing on the second projector 20-2. In the following explanation of the operation of the embodiment, the details of these will be explained.

1-4: Operation of Embodiment

FIGS. 6 and 7 are flowcharts showing an operation example of the information processing apparatus 10. As below, the operation example of the information processing apparatus 10 will be explained with reference to FIGS. 6 and 7.

Note that, in the operation example, the display gradations of the first projector 20-1 and the second projector 20-2 are equally divided into eight levels and these gradations are shown using numbers from 0 to 7. The information processing apparatus 10 calculates correction values for correction of the gradation values of the first projector 20-1 and the second projector 20-2 with respect to each gradation. When the display gradation is 10 bits, relationships between a gradation m and a display gradation t(m) are as follows:

t(0)=0; t(1)=146; t(2)=292; t(3)=438; t(4)=584; t(5)=730; t(6)=876, and t(0)=1023.

At step S1, the processing device 110 provided in the information processing apparatus 10 functions as the detection unit 111. The processing device 110 detects the projection positions of the projected images by the first projector 20-1 and the second projector 20-2 on the wall or the screen.

At step S2, the processing device 110 provided in the information processing apparatus 10 executes a first correction of a reference projector. Here, "reference projector" refers to a projector used as a reference for correction when the correction value of "non-reference projector", which will be described later, is calculated. Note that, as an example, in the operation example, the first projector 20-1 in FIGS. 1 and 2 is "reference projector" and the second projector 20-2 is "non-reference projector".

FIG. 7 is a flowchart showing sub-steps forming step S2.

At Sub-step S21, the processing device 110 provided in the information processing apparatus 10 functions as the generation unit 112. The processing device 110 generates the target image OP and the whole image AP1. Here, the target image OP has a white color at n=7 as the maximum gradation of the first projector 20-1 as a target color of the correction target. Specifically, the RGB values of the target image OP are $(R_{PJ}/G_{PJ}/B_{PJ})=(t(7)/t(7)/t(7))=(1023/1023/1023)$. Further, the whole image AP1 has a unit image UP having a correction value calculation color to be corrected and a unit image UP having a corrected color of the imaging value used for correction in the captured image of the whole image AP1. In the example shown in FIG. 5, the unit image UP having the correction value calculation color is UP[k]. The correction value calculation color of the unit image UP[k] is a white color with a predetermined amount of shift from the white color at n=6. Specifically, the RGB values of the gradation value of the unit image UP[k] having the correction value calculation color are $(R_{PJ}/G_{PJ}/B_{PJ})=(t(6)+d_R/t(6)+d_G/t(6)+d_B)=(876+d_R/876+d_G/876+d_B)$. Here, $d_R$, $d_G$, and $d_B$ are amounts of shift of the gradations in R, G, B, respectively, and some of the values obtained by division of the numerical values from −80 to 80 with respect to each of the 20 gradations. The whole image AP1 has unit images UP having a plurality of correction value calculation colors set using various $d_R$, $d_G$, and $d_B$. On the other hand, the unit images UP having the corrected colors of the imaging values are unit images UP[0] to UP[3] adjacent to UP[k] on the upside, downside, left, and right. The correction value calculation colors of the unit images UP[0] to UP[3] are the white color at n=6. Specifically, the RGB values of the gradation values of the unit images UP[0] to UP[3] are $(R_{PJ}/G_{PJ}/B_{PJ})=(t(6)/t(6)/t(6))=(876/876/876)$.

At Sub-step S22, the processing device 110 provided in the information processing apparatus 10 functions as the output unit 113. The processing device 110 outputs the target image OP and the whole image AP1 to the first projector 20-1.

At Sub-step S23, the processing device 110 provided in the information processing apparatus 10 functions as the first acquisition unit 114. The processing device 110 acquires a captured image obtained by imaging of the range containing the whole image AP1 and the target image OP captured by the imaging apparatus 30. Further, the processing device 110 acquires ($R_{camera}$, $G_{camera}$, $B_{camera}$) as the RGB values of each pixel from the captured image.

At Sub-step S24, the processing device 110 provided in the information processing apparatus 10 functions as the second acquisition unit 115. The processing device 110 acquires the fourth gradation value obtained by correction of the gradation value of the unit image UP[k] based on the gradation value of the unit image UP[A] and the gradation values of the unit image UP[0] to the unit image UP[3] in the captured image acquired at Sub-step S23. In the operation example, when the fourth gradation value is $r_{k2}=r_k+\Delta r_k$, $\Delta r_k$ is expressed by the following equation $$\Delta r_k=(r_0+r_1+r_2+r_3)/4-r_A \qquad \text{Eq. (3')}.$$

Similarly, $\Delta g_k$ is expressed by the following equation $$\Delta g_k=(g_0+g_1+g_2+g_3)/4-g_A \qquad \text{Eq. (4')}.$$

At Sub-step S25, the processing device 110 provided in the information processing apparatus 10 functions as the third acquisition unit 116. The processing device 110 acquires the fifth gradation value obtained by correction of the gradation value of the unit image UP[k'] based on the gradation value of the unit image UP[A] and the gradation values of the unit image UP[0'] to the unit image UP[3'] in the captured image acquired at Sub-step S23. Note that the unit image UP[0'] to the unit image UP[3'] are the unit images UP adjacent to the unit image UP[k'] on the upside, downside, left, and right.

At Sub-step S26, the processing device 110 provided in the information processing apparatus 10 functions as the first calculation unit 117. The processing device 110 calculates the first gradation value difference $\Delta rg_1$ as the difference between the gradation value of the target image OP in the captured image acquired at Sub-step S23 and the fourth gradation value.

At Sub-step S27, the processing device 110 provided in the information processing apparatus 10 functions as the second calculation unit 118. The processing device 110 calculates the second gradation value difference $\Delta rg_2$ as the difference between the gradation value of the target image OP in the captured image acquired at Sub-step S23 and the fifth gradation value.

At Sub-step S28, the processing device 110 provided in the information processing apparatus 10 functions as the correction unit 119. The processing device 110 compares the first gradation value difference $\Delta rg_1$ to the second gradation value difference $\Delta rg_2$. When the first gradation value difference $\Delta rg_1$ is equal to or larger than the second gradation value difference $\Delta rg_2$, the processing device 110 selects the second gradation value difference $\Delta rg_2$. When the first gradation value difference $\Delta rg_1$ is smaller than the second gradation value difference $\Delta rg_2$, the processing device 110 selects the first gradation value difference $\Delta rg_1$.

At Sub-step S29, the processing device 110 provided in the information processing apparatus 10 functions as the correction unit 119. As a result of the comparison between the first gradation value difference $\Delta rg_1$ and the second gradation value difference $\Delta rg_2$ at Sub-step S28 executed between all unit images, when the minimum gradation value difference $\Delta rg_{min}$ is derived (Sub-step S29/YES), the processing device 110 executes processing at Sub-step S30. When the comparison between the first gradation value difference $\Delta rg_1$ and the second gradation value difference $\Delta rg_2$ at Sub-step S28 is executed between not all unit images (Sub-step S29/NO), the processing device 110 executes the processing at Sub-step S24.

At Sub-step S30, the processing device 110 provided in the information processing apparatus 10 functions as the correction unit 119. The processing device 110 sets the amount of shift $(d_R/d_G/d_B)$ from the white color at n=6 in the unit image UP corresponding to the minimum gradation value difference $\Delta rg_{min}$ derived at Sub-step S29 as rough correction values $(\alpha_R(6)/\alpha_G(6)/\alpha_B(6))$ at n=6.

At step S3 in FIG. 6, the processing device 110 provided in the information processing apparatus 10 executes a second correction of the reference projector. The above described first correction is processing of obtaining the rough correction values $(\alpha_R(6)/\alpha_G(6)/\alpha_B(6))$ at n=6. On the other hand, the second correction at step S3 is processing of deriving more precise final correction values $(\beta_R(6)/\beta_G(6)/\beta_B(6))$ using the rough correction values $(\alpha_R(6)/\alpha_G(6)/\alpha_B(6))$.

Also, at step S3, the processing device 110 executes the same operations as those at Sub-steps S21 to S30 shown in FIG. 7. As below, for simplification of the explanation, of the processing at step S3, differences from Sub-steps S21 to S30 forming step S2 will be explained.

At Sub-step S21, the processing device 110 generates the target image OP and the whole image AP1'. In the whole image AP1', the RGB values of the gradation value of the unit image UP [k] are $(R_{P,J}/G_{P,J}/B_{P,J})=(t(6)+d_R+a_R(6)/t(6)+d_G+\alpha_G(6)/t(6)+d_B+a_B(6))=(876+d_R+\alpha_R(6)/876+d_G+\alpha_G(6)/876+d_B+\alpha_B(6))$. Here, $d_R$, $d_G$, and $d_B$ are amounts of shift of the gradations in R, G, B, respectively, and values obtained by division of the numerical values from −40 to 40 with respect to each of the 8 gradations. The whole image AP1' has a unit image UP having a plurality of correction value calculation colors set using various $d_R$, $d_G$, and $d_B$.

In other words, at step S2, when the first gradation value difference $\Delta rg_1$ is equal to or larger than the second gradation value difference $\Delta rg_2$, the processing device 110 sets the whole image AP1 corrected using the first correction value to the new whole image AP1'. On the other hand, at step S2, when the first gradation value difference $\Delta rg_1$ is smaller than the second gradation value difference $\Delta rg_2$, the processing device 110 sets the whole image AP1 corrected using the second correction value to the new whole image AP1'.

At Sub-step S30, the processing device 110 provided in the information processing apparatus 10 functions as the correction unit 119. The processing device 110 sets the amount of shift $(d_R+\alpha_R(6)/d_G+\alpha_G(6)/d_B+\alpha_B(6))$ from the white color at n=6 in the unit image UP corresponding to the minimum gradation value difference $\Delta rg_{min}$ derived at Sub-step S29 as the final correction values $(\beta_R(6)/\beta_G(6)/\beta_B(6))$ at n=6.

In the above description, the processing device 110 provided in the information processing apparatus 10 calculates the final correction values $(\beta_R(6)/\beta_G(6)/\beta_B(6))$ for correction of the gradation value of the unit image UP[k] having the color at the gradation shifted from n=6 using the unit images UP[0] to UP[3] having corrected colors as the white color at n=6. The processing device 110 provided in the information processing apparatus 10 calculates final correction values $(\beta_R(5)/\beta_G(5)/\beta_B(5))$ for correction of the gradation value of the unit image UP[k] having the color at the gradation shifted from n=5 using the unit images UP[0] to UP[3] having corrected colors as the white color at n=5 as the second loop. Subsequently, in the same manner, the processing device 110 provided in the information processing apparatus 10 calculates final correction values $(\beta_R(n)/\beta_G(n)/\beta_B(n))$ for correction of the gradation values of the unit images UP[k] having the colors at the gradations shifted from n=4 to n=1 using the unit images UP[0] to UP[3] having corrected colors as the white colors at n=4 to n=1.

At step S4 in FIG. 6, when the processing device 110 already calculates the final correction values $(\beta_R(n)/\beta_G(n)/\beta_B(n))$ for the six gradations for correction of the gradation values of the unit images UP[k] having the colors at the gradations shifted from n=6 to n=1 using the unit images UP[0] to UP[3] having corrected colors as the white colors at n=6 to n=1 (step S4/YES), the processing device 110 executes processing at step S5. On the other hand, when the processing device 110 does not yet calculate the final correction values $(\beta_R(n)/\beta_G(n)/\beta_B(n))$ for the six gradations for correction of the gradation values of the unit images UP[k] having the colors at the gradations shifted from n=6 to n=1 using the unit images UP[0] to UP[3] having corrected colors as the white colors at n=6 to n=1 (step S4/NO), the processing device 110 executes the processing at steps S2 and S3 with respect to the gradations for which the final correction values are not yet calculated.

At step S5, the processing device 110 provided in the information processing apparatus 10 executes a first correction of the non-reference projector. Here, as described above, the second projector 20-2 is referred to as "non-reference projector".

Also, at step S5, the processing device 110 executes the same operations as those at Sub-steps S21 to S30 shown in FIG. 7. As below, for simplification of the explanation, of the processing at step S5, differences from Sub-steps S21 to S30 forming step S2 will be explained.

At Sub-step S21, the processing device 110 generates the target image OP and the whole image AP2. Here, the target image OP has the white color at n=7 as the maximum gradation of the first projector 20-1 as the target color of the correction target. Specifically, the RGB values of the gradation value of the target image OP are $(R_{PJ}/G_{PJ}/B_{PJ})=(t(7)/t(7)/t(7))=(1023/1023/1023)$. Further, the whole image AP2 has the unit image UP having the correction value calculation color and the unit image UP having the corrected color of the imaging value in the captured image of the whole image AP1. In the example shown in FIG. 5, the unit image UP having the correction value calculation color is the UP[k]. The correction value calculation color of the unit image UP[k] is a white color shifted from the white color at n=7 by a predetermined amount. Specifically, the RGB values of the gradation value of the unit image UP[k] are $(R_{PJ}/G_{PJ}/B_{PJ})=(t(7)+d_R/t(7)+d_G/t(7)+d_B)=(1023+d_R/1023+d_G/1023+d_B)$. Note that, when the RGB values of the unit image UP[k] are larger than 1023, the RGB values are fixed to 1023. Here, $d_R$, $d_G$, and $d_B$ are amounts of shift of the gradations in R, G, B, respectively, and values obtained by division of the numerical values from −80 to 80 with respect to each of the 20 gradations. The whole image AP2 has unit images UP having a plurality of correction value calculation colors set using various $d_R$, $d_G$, and $d_B$. On the other hand, the the unit images UP having the corrected colors of the imaging values are unit images UP[0] to UP[3] adjacent to UP[k] on the upside, downside, left, and right. The correction value calculation colors of the unit images UP[0] to UP[3] are the white color at n=7. Specifically, the RGB values of the gradation values of the unit images UP[0] to UP [3] are $(R_{pj}/G_{PJ}/B_{pj})=(t(7)/t(7)/t(7))=(1023/1023/1023)$.

At Sub-step S22, the processing device 110 provided in the information processing apparatus 10 functions as the output unit 113. The processing device 110 outputs the target image OP to the first projector 20-1. Further, the processing device 110 outputs the whole image AP2 to the second projector 20-2.

At Sub-step S23, the processing device 110 provided in the information processing apparatus 10 functions as the first acquisition unit 114. The processing device 110 acquires a captured image obtained by imaging of the range containing the whole image AP2 and the target image OP captured by the imaging apparatus 30. Further, the processing device 110 acquires $(R_{camera}, G_{camera}, B_{camera})$ as the RGB values of the gray scale value of each pixel from the captured image.

At Sub-step S30, the processing device 110 provided in the information processing apparatus 10 functions as the correction unit 119. The processing device 110 sets the amount of shift $(d_R/d_G/d_B)$ from the white color at n=7 in the unit image UP corresponding to the minimum gradation value difference $\Delta rg_{min}$ derived at Sub-step S29 as rough correction values $(\alpha_R(7)/\alpha_G(7)/\alpha_B(7))$ at n=7.

At step S6 in FIG. 6, the processing device 110 provided in the information processing apparatus 10 executes a second correction of the non-reference projector.

Also, at step S6, the processing device 110 executes the same operations as those at Sub-steps S21 to S30 shown in FIG. 7. As below, for simplification of the explanation, of the processing at step S6, differences from Sub-steps S21 to S30 forming step S2 will be explained.

At Sub-step S21, the processing device 110 generates the target image OP and the whole image AP2'. In the whole image AP2', the RGB values of the gradation value of the unit image UP[k] are $(R_{PJ}/G_{PJ}/B_{PJ})=(t(7)+d_R+\alpha_R(7)/t(7)+d_G+\alpha_G(7)/t(7)+d_B+\alpha_B(7))=(1023+d_R+\alpha_R(7)/1023+d_G+\alpha_G(7)/1023+d_B+\alpha_B(7))$. Here, $d_R$, $d_G$, and $d_B$ are amounts of shift of the gradations in R, G, B, respectively, and values obtained by division of the numerical values from −40 to 40 with respect to each of the 8 gradations. The whole image AP2' has a unit image UP having a plurality of correction value calculation colors set using various $d_R$, $d_G$, and $d_B$. Note that, when the RGB values of the unit image UP[k] are larger than 1023, the RGB values are fixed to 1023.

At Sub-step S30, the processing device 110 provided in the information processing apparatus 10 functions as the correction unit 119. The processing device 110 sets the amount of shift $(d_R+\alpha_R(7)/d_G+\alpha_G(7)/d_B+\alpha_B(7))$ from the white color at n=7 in the unit image UP corresponding to the minimum gradation value difference $\Delta rg_{min}$ derived at Sub-step S29 as the final correction values $(\beta_R(7)/(\beta_G(7)/(\beta_B(7))$ at n=7.

In the above description, the processing device 110 calculates the final correction values $(\beta_R(n)/\beta_G(n)/\beta_B(n))$ for correction of the gradation value of the unit image UP[k] having the color at the gradation shifted from n=7 using the unit images UP[0] to UP[3] having corrected colors as the white color at n=7. The processing device 110 calculates final correction values $(\beta_R(6)/\beta_G(6)/(\beta_B(6))$ for correction of the gradation value of the unit image UP[k] having the color at the gradation shifted from n=6 using the unit images UP[0] to UP[3] having corrected colors as the white color at n=6 as the second loop. Subsequently, in the same manner, the processing device 110 calculates final correction values $(\beta_R(n)/\beta_G(n)/\beta_B(n))$ for correction of the gradation values of the unit images UP[k] having the colors at the gradations shifted from n=5 to n=1 using the unit images UP[0] to UP[3] having corrected colors as the white colors at n=5 to n=1.

At step S7 in FIG. 6, when the processing device 110 already calculates the final correction values $(\beta_R(n)/\beta_G(n)/\beta_B(n))$ for the seven gradations for correction of the gradation values of the unit images UP[k] having the colors of the gradations shifted from n=7 to n=1 using the unit images UP[0] to UP[3] having corrected colors as the white colors at n=7 to n=1 (step S7/YES), the processing device 110 executes processing at step S8. On the other hand, when the processing device 110 does not yet calculate the final correction values $(\beta_R(n)/\beta_G(n)/\beta_B(n))$ for the seven gradations for correction of the gradation values of the unit images UP[k] having the colors of the gradations shifted from n=7 to n=1 using the unit images UP[0] to UP[3] having corrected colors as the white colors at n=7 to n=1 (step S7/NO), the processing device 110 executes the processing at steps S5 and S6 with respect to the gradations for which the final correction values are not yet calculated.

At step S8, the processing device 110 provided in the information processing apparatus 10 functions as the correction unit 119. The processing device 110 writes the final correction values $(\beta_R(n)/\beta_G(n)/\beta_B(n))$ (n is an integer from 1 to 6) for the six gradations calculated at step S3 in the first projector 20-1. Further, the processing device 110 writes the final correction values $(\beta_R(n)/\beta B_G(n)/\beta_B(n))$ (n is an integer from 1 to 7) for the seven gradations calculated at step S6 in the second projector 20-2.

Note that, in the above explanation of the operations, the first projector 20-1 is the reference projector and the second projector 20-2 is the non-reference projector, however, this is just an example.

For example, of the first projector 20-1 and the second projector 20-2, the projector displaying images having shades of colors closer to ideal values may be used as the reference projector.

Specifically, each of the first projector 20-1 and the second projector 20-2 displays a test image for determination of quality for the gradation values of the displayed image. The test image is a displayed image displayed in e.g., solid white. Or, the test image may be the above described target image OP. The imaging apparatus 30 captures the test image displayed by the first projector 20-1. The captured test image is an example of "third captured image". Further, the imaging apparatus 30 captures the test image displayed by the second projector 20-2. The captured test image is an example of "second captured image". The information processing apparatus 10 acquires the gradation value r and the gradation value g of the second captured image and the gradation value r and the gradation value g of the third captured image. The information processing apparatus 10 calculates differences between the gradation value r and the gradation value g of the second captured image and a preset reference gradation value. The calculated gradation value difference is an example of "fourth gradation value difference". Further, the information processing apparatus 10 calculates differences between the gradation value r and the gradation value g of the third captured image and the reference gradation value. The calculated gradation value difference is an example of "third gradation value difference". When the third gradation value difference is smaller than the fourth gradation value difference, the first projector 20-1, i.e., "second display apparatus" is the reference projector.

2: Modified Examples

The present disclosure is not limited to the above exemplified embodiment. Specific modified forms will be exemplified as below.

2-1: Modified Example 1

In the above described embodiment, the display system 1 includes the two projectors of the first projector 20-1 and the second projector 20-2. However, the display system 1 may include an arbitrary number of projectors.

When the display system 1 includes three or more projectors, the information processing apparatus 10 may calculate an average value of the gradation values of the displayed images displayed by the three or more projectors and use the projector displaying the displayed image having the gradation value closest to the average value as the reference projector.

When the display system 1 includes three projectors, each of the first projector 20-1, the second projector 20-2, and a third projector 20-3 displays a test image for determination of quality for the gradation values of the displayed image. The third projector 20-3 is an example of "third display apparatus". The test image is a displayed image displayed in e.g., solid white. Or, the test image may be the above described target image OP. The imaging apparatus 30 captures the test image displayed by the first projector 20-1. The captured test image is an example of "third captured image". Further, the imaging apparatus 30 captures the test image displayed by the second projector 20-2. The captured test image is an example of "second captured image". The imaging apparatus 30 captures the test image displayed by the third projector 20-3. The captured test image is an example of "fourth captured image". The information processing apparatus 10 acquires the gradation value r and the gradation value g of the second captured image, the gradation value r and the gradation value g of the third captured image, and the gradation value r and the gradation value g of the fourth captured image. The information processing apparatus 10 calculates a gradation value r as an average value of the gradation value r of the second captured image, the gradation value r of the third captured image, and the gradation value r of the fourth captured image. Similarly, the information processing apparatus 10 calculates a gradation value g as an average value of the gradation value g of the second captured image, the gradation value g of the third captured image, and the gradation value g of the fourth captured image. Further, the information processing apparatus 10 calculates a difference between the gradation value r of the second captured image and the gradation value r as the average value. Similarly, the information processing apparatus 10 calculates a difference between the gradation value g of the second captured image and the gradation value g as the average value. These calculated gradation value differences are examples of "fourth gradation value difference". Furthermore, the information processing apparatus 10 calculates a difference between the gradation value r of the third captured image and the gradation value r as the average value and a difference between the gradation value g of the third captured image and the gradation value g as the average value. These calculated gradation value differences are examples of "third gradation value difference". The information processing apparatus 10 calculates a difference between the gradation value r of the fourth captured image and the gradation value r as the average value and a difference between the gradation value g of the fourth captured image and the gradation value g. These calculated gradation value differences are examples of "fifth gradation value difference". When the fourth gradation value difference is smaller than both the third gradation value difference and the fifth gradation value difference, the first projector 20-1, i.e., "second display apparatus" is the reference projector.

In this case, the information processing apparatus 10 executes a correction of the displayed image of the third projector 20-3 using the target image OP displayed by the first projector 20-1 and a whole image AP3 displayed by the third projector 20-3. The whole image AP3 displayed by the third projector 20-3 is the same image as the whole image AP1 displayed by the first projector 20-1 and the whole image AP2 displayed by the second projector 20-2. The whole image AP3 is an example of "third whole image".

Specifically, the whole image AP3 includes a plurality of unit images UP containing a sixth unit image UP, a seventh unit image UP, an eighth unit image UP, a ninth unit image UP, and a tenth unit image UP. The sixth unit image UP is located in a sixth area and has a sixth gradation value. The seventh unit image UP is located in a seventh area and has the sixth gradation value. The eighth unit image UP is located in an eighth area and has the sixth gradation value. The ninth unit image UP is located in a ninth area and has a seventh gradation value different from the sixth gradation value. The tenth unit image UP is located in a tenth area and has an eighth gradation value different from the sixth gradation value and the seventh gradation value. The distance from the seventh area to the ninth area is equal to or shorter than the distance from the sixth area to the ninth area. The distance from the seventh area to the ninth area is equal to or shorter than the distance from the seventh area to the tenth area. The distance from the eighth area to the tenth area is equal to or shorter than the distance from the sixth area to the tenth area. The distance from the eighth area to the tenth area is equal to or shorter than the distance from the eighth area to the ninth area.

The information processing apparatus 10 acquires a fifth captured image obtained by imaging of the range containing the whole image AP3 and the target image OP. Further, the information processing apparatus 10 acquires a ninth gradation value obtained by correction of the gradation value of the ninth unit image UP in the fifth captured image based on the gradation value of the sixth unit image UP and the gradation value of the seventh unit image UP in the fifth captured image. The information processing apparatus 10 acquires a tenth gradation value obtained by correction of the gradation value of the tenth unit image UP in the fifth captured image based on the gradation value of the sixth unit image UP and the gradation value of the eighth unit image UP in the fifth captured image. Furthermore, the information processing apparatus 10 calculates a third gradation value difference as a difference between the gradation value of the target image OP and the ninth gradation value in the fifth captured image. The information processing apparatus 10 calculates a fourth gradation value difference as a difference between the gradation value of the target image OP and the tenth gradation value in the fifth captured image. When the third gradation value difference is equal to or larger than the fourth gradation value difference, the information processing apparatus 10 corrects the displayed image displayed by the third display apparatus using a third correction value. When the third gradation value difference is smaller than the fourth gradation value difference, the information processing apparatus 10 corrects the displayed image displayed by the third display apparatus using a fourth correction value.

Or, when the display system 1 includes three or more projectors, the information processing apparatus 10 may use the projector displaying the display image in a position closest to the center of the plurality of displayed images displayed by the three or more projectors on the wall or the screen as the reference projector.

For example, when the display system 1 includes three projectors and the displayed image displayed by the first projector 20-1 is located between the displayed image displayed by the second projector 20-2 and the displayed image displayed by the third projector 20-3, the information processing apparatus 10 may use the first projector 20-1 as the reference projector.

2-2. Modified Example 2

In the above described operation example, the processing device 110 provided in the information processing apparatus 10 executes the first correction and the second correction at the gradation n=6 of the reference projector in the first loop. Then, the processing device 110 executes the first correction and the second correction at the gradation n=5 of the reference projector in the second loop. Subsequently, the processing device 110 executes the first correction and the second correction at the gradation n=7−p of the reference projector in the pth loop (p is an integer from 3 to 6). However, the processing device 110 provided in the information processing apparatus 10 may execute the first correction and the second correction at the plurality of gradations of the reference projector simultaneously in parallel. Similarly, the processing device 110 provided in the information processing apparatus 10 may execute the first correction and the second correction at the plurality of gradations of the non-reference projector simultaneously in parallel.

Further, the processing device 110 provided in the information processing apparatus 10 may execute the first correction and the second correction at an arbitrary gradation of the reference projector and the first correction and the second correction at an arbitrary gradation of the non-reference projector simultaneously in parallel.

2-3: Modified Example 3

In the above described embodiment, the processing device 110 provided in the information processing apparatus 10 corrects the RGB values indicating chromaticity at the pluralities of gradations of the reference projector and the non-reference projector. However, the processing device 110 may correct brightness in place of chromaticity. Or, the processing device 110 may simultaneously correct both chromaticity and brightness. Here, the brightness is an example of the gradation value.

Note that, when the brightness is corrected, different from the above described embodiment, the processing device 110 sets the amounts of shift for R, G, and B at the same gradation to the same value as one another. Specifically, the processing device 110 sets $d_R=d_G=d_B$. Further, the processing device 110 focuses on an imaging pixel value $G_{camera}$ in the captured image in place of the gradation value r and the gradation value g and searches for the unit image UP having brightness closest to a target value.

2-4: Modified Example 4

In the above described embodiment, $d_R$, $d_G$, and $d_B$ are set to the numerical values with 8 or 20 increments. However, the gradation value does not linearly vary relative to the variation of the gradation. For example, at the lower gradations, the variation of the gradation value corresponding to the variation of the single gradation is larger than that at the higher gradations. Accordingly, in order to display the gradation values at equal intervals with respect to each unit image UP, the information processing apparatus 10 may determine $d_R$, $d_G$, and $d_B$ by estimating the displayed gradation value based on the display characteristics of the projector.

2-5: Modified Example 5

In the above described embodiment, the information processing apparatus 10, the first projector 20-1, and the imaging apparatus 30 are separately provided from one another. However, two or more of these apparatuses may be realized as a single apparatus housed in a single housing. The same applies to the information processing apparatus 10, the second projector 20-2, and the imaging apparatus 30.

3: Summary of Present Disclosure

As below, the summary of the present disclosure will be appended.

(Appendix 1) A method of adjusting a displayed image includes displaying, by a first display apparatus, a first whole image including a first unit image located in a first area and having a first gradation value, a second unit image located in a second area and having the first gradation value, a third unit image located in a third area and having the first gradation value, a fourth unit image located in a fourth area and having a second gradation value different from the first gradation value, and a fifth unit image located in a fifth area and having a third gradation value different from the first gradation value and the second gradation value, a distance from the second area to the fourth area being equal to or shorter than a distance from the first area to the fourth area, the distance from the second area to the fourth area being equal to or shorter than a distance from the second area to the fifth area, a distance from the third area to the fifth area being equal to or shorter than a distance from the first area to the fifth area, and the distance from the third area to the fifth area being equal to or shorter than a distance from the third area to the fourth area, acquiring a first captured image obtained by imaging of a range containing the first whole image and a target image as a target of a correction of the gradation value, acquiring a fourth gradation value obtained by correction of the gradation value of the fourth unit image in the first captured image based on the gradation value of the first unit image and the gradation value of the second unit image in the first captured image, acquiring a fifth gradation value obtained by correction of the gradation value of the fifth unit image in the first captured image based on the gradation value of the first unit image and the gradation value of the third unit image in the first captured image, calculating a first gradation value difference as a difference between a gradation value of the target image and the fourth gradation value in the first captured image, calculating a second gradation value difference as a difference between the gradation value of the target image and the fifth gradation value in the first captured image, and correcting a displayed image displayed by the first display apparatus using a first correction value when the first gradation value difference is equal to or larger than the second gradation value difference, and correcting the displayed image displayed by the first display apparatus using a second correction value when the first gradation value difference is smaller than the second gradation value difference.

According to the method of adjusting a displayed image, when shades of colors of the screen are corrected using the captured image obtained by imaging of the projection screen for solving individual differences between the projectors, the adjustment time may be made shorter and the user's convenience becomes higher than those in related art.

(Appendix 2) The method of adjusting a displayed image of Appendix 1, wherein the target image is superimposed on the first whole image.

According to the method of adjusting a displayed image, a user may execute a correction based on a display color in an arbitrary position within the displayed image using the target image within the whole image.

(Appendix 3) The method of adjusting a displayed image of Appendix 2, wherein the target image is located in a sixth area of the first whole image, a distance from a center position of the first whole image to the sixth area is shorter than a distance from the center position to the first area, the distance from the center position of the first whole image to the sixth area is shorter than a distance from the center position to the second area, the distance from the center position of the first whole image to the sixth area is shorter than a distance from the center position to the third area, the distance from the center position of the first whole image to the sixth area is shorter than a distance from the center position to the fourth area, and the distance from the center position of the first whole image to the sixth area is shorter than a distance from the center position to the fifth area.

In the image displayed by the display apparatus, there is a tendency that colors of the displayed image are less degraded as the image is closer to the center of the screen. According to the method of adjusting a displayed image, the target image is placed closer to the center than to the respective areas, and thereby, the user may execute a correction with higher accuracy.

(Appendix 4) The method of adjusting a displayed image of Appendix 1, wherein a second display apparatus displays a second whole image containing the target image.

The method of adjusting a displayed image is used, and thereby, the user may execute a correction according to the image displayed by the second display apparatus using the target image contained in the image displayed by the second display apparatus.

(Appendix 5) The method of adjusting a displayed image of Appendix 4, further includes acquiring a second captured image obtained by imaging of an area containing a test image used for determination of quality for the gradation value of the displayed image displayed by the first display apparatus, and acquiring a third captured image obtained by imaging of an area containing the test image displayed by the second display apparatus, wherein a third gradation value difference as a difference between a reference gradation value as a reference for the quality and a gradation value of the test image in the third captured image is smaller than a fourth gradation value difference as a difference between the reference gradation value and a gradation value of the test image in the second captured image.

The method of adjusting a displayed image is used, and thereby, the user may realize a correction with higher accuracy by correcting based on the target image displayed by the display apparatus displaying an image closer to an ideal value.

(Appendix 6) The method of adjusting a displayed image of Appendix 4, further includes acquiring a second captured image obtained by imaging of an area containing a test image used for determination of quality for the gradation value of the displayed image displayed by the first display apparatus, acquiring a third captured image obtained by imaging of an area containing the test image displayed by the second display apparatus, acquiring a fourth captured image obtained by imaging of an area containing the test image displayed by a third display apparatus, acquiring an average value of a gradation value of the test image in the second captured image, a gradation value of the test image in the third captured image, and a gradation value of the test image in the fourth captured image, a third gradation value difference as a difference between the average value and the gradation value of the test image in the third captured image being smaller than a fourth gradation value difference as a difference between the average value and the gradation value of the test image in the second captured image, the third gradation value difference being smaller than a fifth gradation value difference as a difference between the average value and the gradation value of the test image in the fourth captured image, displaying, by the third display apparatus, a third whole image including a sixth unit image located in a sixth area and having a sixth gradation value, a seventh unit image located in a seventh area and having the sixth gradation value, an eighth unit image located in an eighth area and having the sixth gradation value, a ninth unit image located in a ninth area and having a seventh gradation value different from the sixth gradation value, and a tenth unit image located in a tenth area and having an eighth gradation value different from the sixth gradation value and the seventh gradation value, a distance from the seventh area to the ninth area being equal to or shorter than a distance from the sixth area to the ninth area, the distance from the seventh area to the ninth area being equal to or shorter than a distance from the seventh area to the tenth area, a distance from the eighth area to the tenth area being equal to or shorter than a distance from the sixth area to the tenth area, and the distance from the eighth area to the tenth area being equal to or shorter than a distance from the eighth area to the ninth area, acquiring a fifth captured image obtained by imaging of a range containing the third whole image and the target image, acquiring a ninth gradation value obtained by correction of the gradation value of the ninth unit image in the fifth captured image based on the gradation value of the sixth unit image and the gradation value of the seventh unit image in the fifth captured image, acquiring a tenth gradation value obtained by correction of the gradation value of the tenth unit image in the fifth captured image based on the gradation value of the sixth unit image and the gradation value of the eighth unit image in the fifth captured image, calculating a third gradation value difference as a difference between a gradation value of the target image and the ninth gradation value in the fifth captured image, calculating a fourth gradation value difference as a difference between the gradation value of the target image and the tenth gradation value in the fifth captured image, and correcting a displayed image displayed by the third display apparatus using a third correction value when the third gradation value difference is equal to or larger than the fourth gradation value difference, and correcting the displayed image displayed by the third display apparatus using a fourth correction value when the third gradation value difference is smaller than the fourth gradation value difference.

The method of adjusting a displayed image is used, and thereby, the target image is displayed from the display apparatus providing a gradation value closest to the average of the three or more display apparatuses, and the user may set a value corrected more easily by the other display apparatus as a target value.

(Appendix 7) The method of adjusting a displayed image of Appendix 4, further includes displaying, by a third display apparatus, a third whole image including a sixth unit image located in a sixth area and having a sixth gradation value, a seventh unit image located in a seventh area and having the sixth gradation value, an eighth unit image located in an eighth area and having the sixth gradation value, a ninth unit image located in a ninth area and having a seventh gradation value different from the sixth gradation value, and a tenth unit image located in a tenth area and having an eighth gradation value different from the sixth gradation value and the seventh gradation value, a distance from the seventh area to the ninth area being equal to or shorter than a distance from the sixth area to the ninth area, the distance from the seventh area to the ninth area being equal to or shorter than a distance from the seventh area to the tenth area, a distance from the eighth area to the tenth area being equal to or shorter than a distance from the sixth area to the tenth area, and the distance from the eighth area to the tenth area being equal to or shorter than a distance from the eighth area to the ninth area, acquiring a fifth captured image obtained by imaging of a range containing the third whole image and the target image, acquiring a ninth gradation value obtained by correction of the gradation value of the ninth unit image in the fifth captured image based on the gradation value of the sixth unit image and the gradation value of the seventh unit image in the fifth captured image, acquiring a tenth gradation value obtained by correction of the gradation value of the tenth unit image in the fifth captured image based on the gradation value of the sixth unit image and the gradation value of the eighth unit image in the fifth captured image, calculating a third gradation value difference as a difference between a gradation value of the target image and the ninth gradation value in the fifth captured image, calculating a fourth gradation value difference as a difference between the gradation value of the target image and the tenth gradation value in the fifth captured image, and correcting a displayed image displayed by the third display apparatus using a third correction value when the third gradation value difference is equal to or larger than the fourth gradation value difference, and correcting the displayed image displayed by the third display apparatus using a fourth correction value when the third gradation value difference is smaller than the fourth gradation value difference, wherein the displayed image displayed by the second display apparatus is located between the displayed image displayed by the first display apparatus and the displayed image displayed by the third display apparatus in a first direction.

The method of adjusting a displayed image is used, and thereby, the displayed image located at the center is most visible of the three or more displayed images, and the user may correct surrounding images with reference to the most visible displayed image.

(Appendix 8) The method of adjusting a displayed image of Appendix 1, further includes correcting the first whole image using the first correction value when the first gradation value difference is equal to or larger than the second gradation value difference, and correcting the first whole image using the second correction value when the first gradation value difference is smaller than the second gradation value difference.

The method of adjusting a displayed image is used, and thereby, the user may determine the correction value used for a real correction from the correction values acquired based on a result of imaging of a single image. Accordingly, the user may reduce the time necessary for imaging compared to that in related art capturing many images. Further, the user's convenience becomes higher.

(Appendix 9) A display system includes a first display apparatus displaying a first whole image including a first unit image located in a first area and having a first gradation value, a second unit image located in a second area and having the first gradation value, a third unit image located in a third area and having the first gradation value, a fourth unit image located in a fourth area and having a second gradation value different from the first gradation value, and a fifth unit image located in a fifth area and having a third gradation value different from the first gradation value and the second gradation value, a distance from the second area to the fourth area being equal to or shorter than a distance from the first area to the fourth area, the distance from the second area to the fourth area being equal to or shorter than a distance from the second area to the fifth area, a distance from the third area to the fifth area being equal to or shorter than a distance from the first area to the fifth area, and the distance from the third area to the fifth area being equal to or shorter than a distance from the third area to the fourth area, an imaging apparatus generating a first captured image by imaging a range containing the first whole image and a target image as a target of a correction of the gradation value, and an information processing apparatus executing acquiring the first captured image, acquiring a fourth gradation value obtained by correction of the gradation value of the fourth unit image in the first captured image based on the gradation value of the first unit image and the gradation value of the second unit image in the first captured image, acquiring a fifth gradation value obtained by correction of the gradation value of the fifth unit image in the first captured image based on the gradation value of the first unit image and the gradation value of the third unit image in the first captured image, calculating a first gradation value difference as a difference between a gradation value of the target image and the fourth gradation value in the first captured image, calculating a second gradation value difference as a difference between the gradation value of the target image and the fifth gradation value in the first captured image, and correcting a displayed image displayed by the first display apparatus using a first correction value when the first gradation value difference is equal to or larger than the second gradation value difference, and correcting the displayed image displayed by the first display apparatus using a second correction value when the first gradation value difference is smaller than the second gradation value difference.

According to the display system, when shades of colors of the screen are corrected using the captured image obtained by imaging of the projection screen for solving individual differences between the projectors, the adjustment time may be made shorter and the user's convenience becomes higher than those in related art.

(Appendix 10) A display system includes a first display apparatus displaying a first whole image including a first unit image located in a first area and having a first gradation value, a second unit image located in a second area and having the first gradation value, a third unit image located in a third area and having the first gradation value, a fourth unit image located in a fourth area and having a second gradation value different from the first gradation value, and a fifth unit image located in a fifth area and having a third gradation value different from the first gradation value and the second gradation value, a distance from the second area to the fourth area being equal to or shorter than a distance from the first area to the fourth area, the distance from the second area to the fourth area being equal to or shorter than a distance from the second area to the fifth area, a distance from the third area to the fifth area being equal to or shorter than a distance from the first area to the fifth area, and the distance from the third area to the fifth area being equal to or shorter than a distance from the third area to the fourth area, a second display apparatus displaying a target image as a target of a correction of the gradation value, an imaging apparatus generating a first captured image by imaging a range containing the first whole image and the target image, and an information processing apparatus executing acquiring the first captured image, acquiring a fourth gradation value obtained by correction of the gradation value of the fourth unit image in the first captured image based on the gradation value of the first unit image and the gradation value of the second unit image in the first captured image, acquiring a fifth gradation value obtained by correction of the gradation value of the fifth unit image in the first captured image based on the gradation value of the first unit image and the gradation value of the third unit image in the first captured image, calculating a first gradation value difference as a difference between a gradation value of the target image and the fourth gradation value in the first captured image, calculating a second gradation value difference as a difference between the gradation value of the target image and the fifth gradation value in the first captured image, and correcting a displayed image displayed by the first display apparatus using a first correction value when the first gradation value difference is equal to or larger than the second gradation value difference, and correcting the displayed image displayed by the first display apparatus using a second correction value when the first gradation value difference is smaller than the second gradation value difference.

According to the display system, when shades of colors of the screen are corrected using the captured image obtained by imaging of the projection screen for solving individual differences between the projectors, the adjustment time may be made shorter and the user's convenience becomes higher than those in related art.

(Appendix 11) An information processing program is for controlling a computer to execute displaying, by a first display apparatus, a first whole image including a first unit image located in a first area and having a first gradation value, a second unit image located in a second area and having the first gradation value, a third unit image located in a third area and having the first gradation value, a fourth unit image located in a fourth area and having a second gradation value different from the first gradation value, and a fifth unit image located in a fifth area and having a third gradation value different from the first gradation value and the second gradation value, a distance from the second area to the fourth area being equal to or shorter than a distance from the first area to the fourth area, the distance from the second area to the fourth area being equal to or shorter than a distance from the second area to the fifth area, a distance from the third area to the fifth area being equal to or shorter than a distance from the first area to the fifth area, and the distance from the third area to the fifth area being equal to or shorter than a distance from the third area to the fourth area, acquiring a first captured image obtained by imaging of a range containing the first whole image and a target image as a target of a correction of the gradation value, acquiring the first captured image, acquiring a fourth gradation value obtained by correction of the gradation value of the fourth unit image in the first captured image based on the gradation value of the first unit image and the gradation value of the second unit image in the first captured image, acquiring a fifth gradation value obtained by correction of the gradation value of the fifth unit image in the first captured image based on the gradation value of the first unit image and the gradation value of the third unit image in the first captured image, calculating a first gradation value difference as a difference between a gradation value of the target image and the fourth gradation value in the first captured image, calculating a second gradation value difference as a difference between the gradation value of the target image and the fifth gradation value in the first captured image, and correcting a displayed image displayed by the first display apparatus using a first correction value when the first gradation value difference is equal to or larger than the second gradation value difference, and correcting the displayed image displayed by the first display apparatus using a second correction value when the first gradation value difference is smaller than the second gradation value difference.

According to the information processing program, when shades of colors of the screen are corrected using the captured image obtained by imaging of the projection screen for solving individual differences between the projectors, the adjustment time may be made shorter and the user's convenience becomes higher than those in related art.

What is claimed is:
1. A method of adjusting a displayed image comprising:
  displaying, by a first display apparatus, a first whole image including
    a first unit image located in a first area and having a first gradation value,
    a second unit image located in a second area and having the first gradation value,
    a third unit image located in a third area and having the first gradation value,
    a fourth unit image located in a fourth area and having a second gradation value different from the first gradation value, and
    a fifth unit image located in a fifth area and having a third gradation value different from the first gradation value and the second gradation value,
    a distance from the second area to the fourth area being equal to or shorter than a distance from the first area to the fourth area, the distance from the second area to the fourth area being equal to or shorter than a distance from the second area to the fifth area, a distance from the third area to the fifth area being equal to or shorter than a distance from the first area to the fifth area, and the distance from the third area to the fifth area being equal to or shorter than a distance from the third area to the fourth area;

acquiring a first captured image obtained by imaging of a range containing the first whole image and a target image as a target of a correction of the gradation value;

acquiring a fourth gradation value obtained by correction of the gradation value of the fourth unit image in the first captured image based on the gradation value of the first unit image and the gradation value of the second unit image in the first captured image;

acquiring a fifth gradation value obtained by correction of the gradation value of the fifth unit image in the first captured image based on the gradation value of the first unit image and the gradation value of the third unit image in the first captured image;

calculating a first gradation value difference as a difference between a gradation value of the target image and the fourth gradation value in the first captured image;

calculating a second gradation value difference as a difference between the gradation value of the target image and the fifth gradation value in the first captured image; and correcting a displayed image displayed by the first display apparatus using a first correction value when the first gradation value difference is equal to or larger than the second gradation value difference, and correcting the displayed image displayed by the first display apparatus using a second correction value when the first gradation value difference is smaller than the second gradation value difference.

2. The method of adjusting a displayed image according to claim 1, wherein
the target image is superimposed on the first whole image.

3. The method of adjusting a displayed image according to claim 2, wherein
the target image is located in a sixth area of the first whole image,
a distance from a center position of the first whole image to the sixth area is shorter than a distance from the center position to the first area,
the distance from the center position of the first whole image to the sixth area is shorter than a distance from the center position to the second area,
the distance from the center position of the first whole image to the sixth area is shorter than a distance from the center position to the third area,
the distance from the center position of the first whole image to the sixth area is shorter than a distance from the center position to the fourth area, and
the distance from the center position of the first whole image to the sixth area is shorter than a distance from the center position to the fifth area.

4. The method of adjusting a displayed image according to claim 1, wherein
a second display apparatus displays a second whole image containing the target image.

5. The method of adjusting a displayed image according to claim 4, further comprising:
acquiring a second captured image obtained by imaging of an area containing a test image used for determination of quality for the gradation value of the displayed image displayed by the first display apparatus; and
acquiring a third captured image obtained by imaging of an area containing the test image displayed by the second display apparatus, wherein
a third gradation value difference as a difference between a reference gradation value as a reference for the quality and a gradation value of the test image in the third captured image is smaller than a fourth gradation value difference as a difference between the reference gradation value and a gradation value of the test image in the second captured image.

6. The method of adjusting a displayed image according to claim 4, further comprising:
acquiring a second captured image obtained by imaging of an area containing a test image used for determination of quality for the gradation value of the displayed image displayed by the first display apparatus;
acquiring a third captured image obtained by imaging of an area containing the test image displayed by the second display apparatus;
acquiring a fourth captured image obtained by imaging of an area containing the test image displayed by a third display apparatus;
acquiring an average value of a gradation value of the test image in the second captured image, a gradation value of the test image in the third captured image, and a gradation value of the test image in the fourth captured image,
a third gradation value difference as a difference between the average value and the gradation value of the test image in the third captured image being smaller than a fourth gradation value difference as a difference between the average value and the gradation value of the test image in the second captured image,
the third gradation value difference being smaller than a fifth gradation value difference as a difference between the average value and the gradation value of the test image in the fourth captured image,
displaying, by the third display apparatus, a third whole image including
a sixth unit image located in a sixth area and having a sixth gradation value,
a seventh unit image located in a seventh area and having the sixth gradation value,
an eighth unit image located in an eighth area and having the sixth gradation value,
a ninth unit image located in a ninth area and having a seventh gradation value different from the sixth gradation value, and
a tenth unit image located in a tenth area and having an eighth gradation value different from the sixth gradation value and the seventh gradation value,
a distance from the seventh area to the ninth area being equal to or shorter than a distance from the sixth area to the ninth area,
the distance from the seventh area to the ninth area being equal to or shorter than a distance from the seventh area to the tenth area,
a distance from the eighth area to the tenth area being equal to or shorter than a distance from the sixth area to the tenth area, and
the distance from the eighth area to the tenth area being equal to or shorter than a distance from the eighth area to the ninth area;

acquiring a fifth captured image obtained by imaging of a range containing the third whole image and the target image;

acquiring a ninth gradation value obtained by correction of the gradation value of the ninth unit image in the fifth captured image based on the gradation value of the sixth unit image and the gradation value of the seventh unit image in the fifth captured image;

acquiring a tenth gradation value obtained by correction of the gradation value of the tenth unit image in the fifth captured image based on the gradation value of the sixth unit image and the gradation value of the eighth unit image in the fifth captured image;

calculating a third gradation value difference as a difference between a gradation value of the target image and the ninth gradation value in the fifth captured image;

calculating a fourth gradation value difference as a difference between the gradation value of the target image and the tenth gradation value in the fifth captured image; and correcting a displayed image displayed by the third display apparatus using a third correction value when the third gradation value difference is equal to or larger than the fourth gradation value difference, and correcting the displayed image displayed by the third display apparatus using a fourth correction value when the third gradation value difference is smaller than the fourth gradation value difference.

7. The method of adjusting a displayed image according to claim 4, further comprising:

displaying, by a third display apparatus, a third whole image including a sixth unit image located in a sixth area and having a sixth gradation value, a seventh unit image located in a seventh area and having the sixth gradation value, an eighth unit image located in an eighth area and having the sixth gradation value, a ninth unit image located in a ninth area and having a seventh gradation value different from the sixth gradation value, and a tenth unit image located in a tenth area and having an eighth gradation value different from the sixth gradation value and the seventh gradation value, a distance from the seventh area to the ninth area being equal to or shorter than a distance from the sixth area to the ninth area, the distance from the seventh area to the ninth area being equal to or shorter than a distance from the seventh area to the tenth area, a distance from the eighth area to the tenth area being equal to or shorter than a distance from the sixth area to the tenth area, and the distance from the eighth area to the tenth area being equal to or shorter than a distance from the eighth area to the ninth area;

acquiring a fifth captured image obtained by imaging of a range containing the third whole image and the target image;

acquiring a ninth gradation value obtained by correction of the gradation value of the ninth unit image in the fifth captured image based on the gradation value of the sixth unit image and the gradation value of the seventh unit image in the fifth captured image;

acquiring a tenth gradation value obtained by correction of the gradation value of the tenth unit image in the fifth captured image based on the gradation value of the sixth unit image and the gradation value of the eighth unit image in the fifth captured image;

calculating a third gradation value difference as a difference between a gradation value of the target image and the ninth gradation value in the fifth captured image;

calculating a fourth gradation value difference as a difference between the gradation value of the target image and the tenth gradation value in the fifth captured image; and correcting a displayed image displayed by the third display apparatus using a third correction value when the third gradation value difference is equal to or larger than the fourth gradation value difference, and correcting the displayed image displayed by the third display apparatus using a fourth correction value when the third gradation value difference is smaller than the fourth gradation value difference, wherein the displayed image displayed by the second display apparatus is located between the displayed image displayed by the first display apparatus and the displayed image displayed by the third display apparatus in a first direction.

8. The method of adjusting a displayed image according to claim 1, further comprising:

correcting the first whole image using the first correction value when the first gradation value difference is equal to or larger than the second gradation value difference; and correcting the first whole image using the second correction value when the first gradation value difference is smaller than the second gradation value difference.

9. A display system comprising:

a first display apparatus displaying a first whole image including a first unit image located in a first area and having a first gradation value, a second unit image located in a second area and having the first gradation value, a third unit image located in a third area and having the first gradation value, a fourth unit image located in a fourth area and having a second gradation value different from the first gradation value, and a fifth unit image located in a fifth area and having a third gradation value different from the first gradation value and the second gradation value, a distance from the second area to the fourth area being equal to or shorter than a distance from the first area to the fourth area, the distance from the second area to the fourth area being equal to or shorter than a distance from the second area to the fifth area, a distance from the third area to the fifth area being equal to or shorter than a distance from the first area to the fifth area, and the distance from the third area to the fifth area being equal to or shorter than a distance from the third area to the fourth area;

an imaging apparatus generating a first captured image by imaging a range containing the first whole image and a target image as a target of a correction of the gradation value; and an information processing apparatus executing acquiring the first captured image;

acquiring a fourth gradation value obtained by correction of the gradation value of the fourth unit image in the first captured image based on the gradation value of the first unit image and the gradation value of the second unit image in the first captured image;

acquiring a fifth gradation value obtained by correction of the gradation value of the fifth unit image in the first captured image based on the gradation value of the first unit image and the gradation value of the third unit image in the first captured image;

calculating a first gradation value difference as a difference between a gradation value of the target image and the fourth gradation value in the first captured image;

calculating a second gradation value difference as a difference between the gradation value of the target image and the fifth gradation value in the first captured image; and correcting a displayed image displayed by the first display apparatus using a first correction value when the first gradation value difference is equal to or larger than the second gradation value difference, and correcting the displayed image displayed by the first display apparatus using a second correction value when the first gradation value difference is smaller than the second gradation value difference.

10. A display system comprising:

a first display apparatus displaying a first whole image including a first unit image located in a first area and having a first gradation value, a second unit image located in a second area and having the first gradation value, a third unit image located in a third area and having the first gradation value, a fourth unit image located in a fourth area and having a second gradation value different from the first gradation value, and a fifth unit image located in a fifth area and having a third gradation value different from the first gradation value and the second gradation value, a distance from the second area to the fourth area being equal to or shorter than a distance from the first area to the fourth area, and the distance from the second area to the fourth area being equal to or shorter than a distance from the second area to the fifth area, a distance from the third area to the fifth area being equal to or shorter than a distance from the first area to the fifth area, and the distance from the third area to the fifth area being equal to or shorter than a distance from the third area to the fourth area;

a second display apparatus displaying a target image as a target of a correction of the gradation value;

an imaging apparatus generating a first captured image by imaging a range containing the first whole image and the target image; and an information processing apparatus executing acquiring the first captured image;

acquiring a fourth gradation value obtained by correction of the gradation value of the fourth unit image in the first captured image based on the gradation value of the first unit image and the gradation value of the second unit image in the first captured image;

acquiring a fifth gradation value obtained by correction of the gradation value of the fifth unit image in the first captured image based on the gradation value of the first unit image and the gradation value of the third unit image in the first captured image;

calculating a first gradation value difference as a difference between a gradation value of the target image and the fourth gradation value in the first captured image;

calculating a second gradation value difference as a difference between the gradation value of the target image and the fifth gradation value in the first captured image; and correcting a displayed image displayed by the first display apparatus using a first correction value when the first gradation value difference is equal to or larger than the second gradation value difference, and correcting the displayed image displayed by the first display apparatus using a second correction value when the first gradation value difference is smaller than the second gradation value difference.

* * * * *